(12) United States Patent
Miranda et al.

(10) Patent No.: US 8,666,919 B2
(45) Date of Patent: Mar. 4, 2014

(54) DATA QUALITY MANAGEMENT FOR PROFILING, LINKING, CLEANSING AND MIGRATING DATA

(75) Inventors: Julio Sánchez Miranda, Málaga (ES); Mario Abad Barajas, Málaga (ES); Hersh Shah, South Brunswick, NJ (US); Mary A. Ohara, Newark, DE (US); John Y. Miller, Toronto (CA); Christina Han Xiao, Morrisville, NC (US); Simon L. Terr, Boulder, CO (US)

(73) Assignee: Accenture Global Services Limited, Dublin (IE)

( * ) Notice: Subject to any disclaimer, the term of this patent is extended or adjusted under 35 U.S.C. 154(b) by 276 days.

(21) Appl. No.: 13/194,135

(22) Filed: Jul. 29, 2011

(65) Prior Publication Data

US 2013/0031044 A1    Jan. 31, 2013

(51) Int. Cl.
G06F 17/00    (2006.01)
G06F 7/00    (2006.01)
G06N 99/00    (2010.01)

(52) U.S. Cl.
CPC .................................. *G06N 99/005* (2013.01)
USPC ............................................. 706/45; 707/609

(58) Field of Classification Search
None
See application file for complete search history.

(56) References Cited

U.S. PATENT DOCUMENTS

| | | |
|---|---|---|
| 4,882,752 A | 11/1989 | Lindman et al. |
| 5,355,474 A | 10/1994 | Thuraisngham et al. |
| 5,872,847 A | 2/1999 | Boyle et al. |
| 5,960,080 A | 9/1999 | Fahlman et al. |
| 5,999,192 A | 12/1999 | Selfridge et al. |
| 6,304,973 B1 | 10/2001 | Williams |
| 6,430,602 B1 | 8/2002 | Kay et al. |
| 6,678,822 B1 | 1/2004 | Morar et al. |
| 6,834,382 B2 | 12/2004 | Marso et al. |
| 7,231,378 B2 | 6/2007 | Lawson et al. |
| 7,805,415 B1 | 9/2010 | Flesher et al. |
| 2002/0073058 A1 | 6/2002 | Kremer et al. |
| 2002/0083210 A1 | 6/2002 | Harrison et al. |
| 2002/0141449 A1 | 10/2002 | Johnson |
| 2003/0200192 A1 | 10/2003 | Bell et al. |
| 2004/0083199 A1 * | 4/2004 | Govindugari et al. ............ 707/1 |
| 2004/0088723 A1 | 5/2004 | Ma et al. |
| 2004/0153908 A1 | 8/2004 | Schiavone et al. |
| 2004/0186836 A1 | 9/2004 | Schlesinger |
| 2005/0065950 A1 | 3/2005 | Chaganti et al. |
| 2009/0037488 A1 * | 2/2009 | Abrams ........................ 707/201 |
| 2012/0158678 A1 * | 6/2012 | McGraw et al. .............. 707/694 |
| 2012/0330911 A1 * | 12/2012 | Gruenheid et al. ........... 707/694 |

OTHER PUBLICATIONS

Myliymaki, J.; Effective Web Data Extraction with Standard XML Technologies; May 1, 2001; ACM; p. 689-696.

* cited by examiner

*Primary Examiner* — Alan Chen
(74) *Attorney, Agent, or Firm* — Fish & Richardson P.C.

(57) ABSTRACT

A data quality management system includes a rules repository configured to store profiling data quality rules, cleansing data quality rules, and linking data that links profiling data quality rules to cleansing data quality rules. The data quality management system also includes a rules management module configured to manage the rules repository. The data quality management system further includes a data quality job management module configured to migrate data quality rules from the rules repository to a data quality processing system and manage a data quality process performed by the data quality processing system using the migrated data quality rules.

20 Claims, 26 Drawing Sheets

900

New Rule

| | |
|---|---|
| Rule Name | |
| Rule type | Profiling ▾   DQ Rule type  Column ▾ |
| Condition | |
| New value | □   In Source |
| Null | □   Key  □ |
| Created in IA | □   Transfered  □ |
| Formating | |
| Join Type Left Right | |

Cancel   Save

| ID | IN_SOURCE | RULE_NAME | CONDITION | RULE_TYPE | ISNULL | ISKEY | FORMATTING | CREATED_IN_IA | TRANSFERRED | INDUSTRY | LINK_DATA | DQ_RULE_TYPE |
|---|---|---|---|---|---|---|---|---|---|---|---|---|
| 1 | DB2 | DNI Rule | DNI MATCHES_FORMAT "99999999X" where DNI = DQINPUT_CUTOMER.DNI | Profiling | N | N | 99999999X | N | Y | INDUSTRY #1 | Rule ID = 4 | Column |
| 2 | DB2 | Gender Rule | GENDER IN_REFERENCE_LIST {'M';'F'} where GENDER = DQINPUT_CUSTO... | Profiling | N | N | | N | Y | INDUSTRY #2 | | Column |
| 3 | DB2 | Customer Name | CUSTOMERNAME NOT CONTAINS "WWW" where CUSTOMERNAME – DQIN... | Profiling | N | N | | N | Y | INDUSTRY #3 | Rule ID = 5 | Column |

Search Rule

Valorize Rule Name field with full name or a part of it.

Rule Name: ☐
(Use % to retrieve all rules)

Back          Search

Rule Management

Found [ 4 ] rule.
Select a rule name and press LOCK to work on associated data:

| Rulename | Select |
|---|---|
| Rule Customer Name | ○ |
| Rule_Customer_in_Shipping | ○ |
| RuleCustomerNameGloss | ○ |
| R1 CUSTOMER EXISTS | ○ |

[ 1 First ]   1   [ Last 1 ]

Back    Lock Rule

FIG. 12

Modify Rule

1400

| Rule Name | Rule Customer Name |
| Rule Type | Profiling | DQ Rule type | Column |
| Condition | CUSTOMERNAME NOT CONTAINS "WWW" where CUSTOMERNAME = DQINPUT_CE |
| New value | | In Source | odbcOracleTest |
| Null | | Key | |
| Created in IA | | Transfered | |
| Formating | | | |
| Join Type Left Right | | | |

Cancel    Save

FIG. 14

▲ Logout
▲ Password Management
▲ Add New Job
▲ Search Job
▲ Add New Kpi
▲ Search Kpi
▲ Add Area
▲ Search Area
▲ Add SubjectArea
▲ Search Subject Area
▲ Add New User
▲ Add New DQ Rule
▲ Search DQ Rule
▲ Delete DQ Rule
▲ Modify DQ Rule

Real Time Monitoring    1702

| Job Name | Session ID | Date Start Run | Time Execution | Status Last Run |
|---|---|---|---|---|
| L1_PRO1_Load_Tora_Full_DQ_Rules_Ora | 125 | 2011-04-12 10:40:02 | 2 | Y |
| L1_PRO2_Load_Input_Customer_Ora | 125 | 2011-04-12 10:40:08 | 1 | Y |
| L1_PRO3_Load_Input_Shipping_Ora | 125 | 2011-04-12 10:40:13 | 2 | Y |
| L2_PRO3_DQ_Output_Customer_Ora_QB | 125 | 2011-04-12 10:40:19 | 4 | Y |

| Row Read | Row Write | Row Error | Short Name Source | Short Name Target | Endstate |
|---|---|---|---|---|---|
| 12 | 0 | 0 | Source_Demo | Target_Demo | RUN-OK |
| 90 | 0 | 0 | Source_Demo | Target_Demo | RUN-OK |
| 86 | 0 | 0 | Source_Demo | Target_Demo | RUN-OK |
| 405 | 0 | 0 | Source_Demo | Target_Demo | RUN-WARNING |

FIG. 17C

Rules Report

1800

| Data from execution date: | 05-10-2010 | | | |
|---|---|---|---|---|
| RULE | DQ RULE | RULE TYPE | QUANTITY OK | QUANTITY NOT OK |
| DQINPUT_CUSTOMER.AGE<0 new Value: 0 | Column | Cleansing | 5 | 1 |
| DQINPUT_CUSTOMER.DNI FORMAT 99999999Z | Column | Profiling | 5 | 1 |
| DQINPUT_CUSTOMER.GENDER Format: M of F | Column | Profiling | 5 | 1 |
| DQINPUT_CUSTOMER.GENDER related to short name in DQINPUT_CUSTOMER.NAME | Column | Profiling | 5 | 1 |
| DQINPUT_CUSTOMER.NAME exists in table DQINPUT_SHIPPING | Structure | Profiling | 6 | 0 |
| DQINPUT_SHIPPING. SHIPPING_DATE >= DQINPUT_SHIPPING_SALE_DATE | Business | Profiling | 5 | 1 |

FIG. 18

Profiling Input Report

| Data from execution date: | 22-10-2010 | | | 2100 | |
|---|---|---|---|---|---|

| TABLE INFORMATION | INPUT RECORD ID | RULE CONDITION | RULE TYPE |
|---|---|---|---|
| Customer_Ora_QS | 4 | DQINPUT_SHIPPING.SHIPPING_DATE >=DQINPUT_SHIPPING.SALE_DATE | Business |
| Customer_Ora_QS | 5 | DQINPUT_CUSTOMER.GENDER Format: M of F | Column |
| Customer_Ora_QS | 5 | DQINPUT_CUSTOMER.NAME exists in table DQINPUT_SHIPPING | Structure |
| Customer_Ora_QS | 5 | DQINPUT_CUSTOMER.GENDER related to short name DQINPUT_CUSTOMER.NAME | Business |
| Customer_Ora_QS | 6 | DQINPUT_CUSTOMER.DNI  Format: 999999999Z | Column |
| Customer_Ora_QS | 6 | DQINPUT_CUSTOMER.NAME exists in table DQINPUT_SHIPPING | Structure |
| Customer_Ora_QS | 7 | DQINPUT_CUSTOMER.GENDER  Format: M or F | Column |
| Customer_Ora_QS | 7 | DQINPUT_SHIPPING.SHIPPING_DATE >= DQINPUT_SHIPPING.SALE_DATE | Business |
| Customer_Ora_QS | 7 | DQINPUT_CUSTOMER.GENDER related to short name in DQINPUT_CUSTOMER.NAME | Business |
| Customer_Ora_QS | 8 | DQINPUT_CUSTOMER.GENDER related to short name in DQINPUT_CUSTOMER.NAME | Business |
| Customer_Ora_QS | 11 | DQINPUT_CUSTOMER.NAME exists in table DQINPUT_SHIPPING | Structure |
| Customer_Ora_QS | 12 | DQINPUT_CUSTOMER.GENDER related to short name in DQINPUT_CUSTOMER.NAME | Business |
| Customer_Ora_QS | 13 | DQINPUT_SHIPPING.SHIPPING_DATE <= DQINPUT_SHIPPING.SALE_DATE | Business |
| Customer_Ora_QS | 13 | DQINPUT_CUSTOMER.GENDER related to short name in DQINPUT_CUSTOMER.NAME | Business |
| Customer_Ora_QS | 15 | DQINPUT_SHIPPING.SHIPPING_DATE <= DQINPUT_SHIPPING.SALE_DATE | Business |
| Customer_Ora_QS | 20 | DQINPUT_CUSTOMER.GENDER related to short name in DQINPUT_CUSTOMER.NAME | Business |
| Customer_Ora_QS | 23 | DQINPUT_CUSTOMER.DNI  Format 999999999Z | Column |
| Customer_Ora_QS | 27 | DQINPUT_CUSTOMER.GENDER related to short name in DQINPUT_CUSTOMER.NAME | Business |
| Customer_Ora_QS | 34 | DQINPUT_CUSTOMER.GENDER related to short name in DQINPUT_CUSTOMER.NAME | Business |
| Customer_Ora_QS | 35 | DQINPUT_CUSTOMER.NAME exists in table DQINPUT_SHIPPING | Structure |

FIG. 21

Cleansing Input Report

2200

| Data from execution date | 22-10-2010 | | |
|---|---|---|---|
| TABLE INFORMATION | INPUT RECORD ID | RULE CONDITION | RULE TYPE |
| Customer_Ora_QS | 4 | DQINPUT_CUSTOMER.AGE<0 New Value: 0 | Column |
| Costomer_Ora_QS | 22 | DQINPUT_CUSTOMER.AGE<0 New Value: 0 | Column |
| Customer_Ora_QS | 30 | DQINPUT_CUSTOMER.AGE<0 New Value: 0 | Column |

FIG. 22

DATA QUALITY MANAGEMENT FOR PROFILING, LINKING, CLEANSING AND MIGRATING DATA

FIELD

This disclosure relates to data quality management.

BACKGROUND

A growing demand exists for data management solutions. As the sophistication of data warehousing and business intelligence architectures and solutions increases, the recognition of poor data quality is becoming a barrier to success and has increased demand for data quality services. In traditional data quality solutions, however, the effort to define and apply data quality rules may be labor intensive.

SUMMARY

In one aspect, a data quality management system includes a rules repository configured to store profiling data quality rules, cleansing data quality rules, and linking data that links profiling data quality rules to cleansing data quality rules. The data quality management system also include a rules management module configured to manage the rules repository by managing the profiling data quality rules stored in the rules repository, managing the cleansing data quality rules stored in the rules repository, and managing the linking data stored in the rules repository. The data quality management system further includes a data quality job management module configured to migrate data quality rules from the rules repository to a data quality processing system and manage a data quality process performed by the data quality processing system using the migrated data quality rules. The migrated data quality rules include one or more linked pairs of data quality rules that have a profiling data quality rule linked to a cleansing data quality rule by the linking data and the data quality job management module is configured to control the data quality processing system to execute the one or more linked pairs of data quality rules. In another aspect, a method may include one or more of the operations recited above as being performed by the data quality management system. In yet another aspect, a computer-readable storage medium may be operable to cause a processor to perform one or more of the operations described above as being performed by the data quality management system.

Implementations may include one or more of the following features. For example, the rules repository may be configured to store the profiling data quality rules, the cleansing data quality rules, and the linking data in a generic format that is not specific to any particular data quality processing system. The rules management module may be configured to organize the profiling data quality rules and the cleansing data quality rules by industry for a user to select a particular industry and receive a subset of the profiling data quality rules and the cleansing data quality rules that are relevant to the particular industry.

In addition, the data quality job management module may be configured to monitor the data quality process performed by the data quality processing system using the migrated data quality rules. The data quality job management module may be configured to monitor an entire operation of the data quality process performed by the data quality processing system including monitoring results of data profiling performed by the data quality processing system and monitoring results of data cleansing performed by the data quality processing system. The data quality job management module may be configured to control the data quality processing system to execute the one or more linked pairs of data quality rules in a coordinated manner.

Further, the rules management module may be configured to access inferred profiling and cleansing data quality rules and store the inferred profiling and cleansing data quality rules in the rules repository. The rules management module may be configured to receive user input defining a new profiling data quality rule and a new cleansing data quality rule and store the new profiling data quality rule and the new cleansing data quality rule in the rules repository.

In some implementations, the rules management module may be configured to receive user input linking the new profiling data quality rule to the new cleansing data quality rule and store, in the rules repository, linking data that links the new profiling data quality rule to the new cleansing data quality rule. In these implementations, the data quality job management module may be configured to recognize that the new profiling data quality rule is linked to the new cleansing data quality rule based on the stored linking data that links the new profiling data quality rule to the new cleansing data quality rule, control the data quality processing system to execute the new profiling data quality rule to identify errors in data records, and, based on the recognition that the new profiling data quality rule is linked to the new cleansing data quality rule and without user input after controlling the data quality processing system to execute the new profiling data quality rule, control the data quality processing system to execute the new cleansing data quality rule on the data records identified as having errors according to the new profiling data quality rule.

The rules management module may be configured to link profiling data quality rules with cleansing data quality rules, organize profiling data quality rules and cleansing data quality rules by industry, and store, in the rules repository, profiling data quality rules and cleansing data quality rules organized by industry and with linking data that links profiling data quality rules with cleansing data quality rules. The rules management module may be configured to modify data quality rules data in the rules repository. For example, the rules management module may be configured to receive user input defining a search query for data quality rules in the rules repository, perform a search for data quality rules in the rules repository based on the search query, identify data quality rules in the rules repository that match the search query based on performance of the search, and present the identified data quality rules with one or more controls for a user to select one of the identified data quality rules. In this example, the rules management module may be configured to receive user input selecting a data quality rule from among the identified data quality rules, lock the selected data quality rule based on the selection, allow a change to the selected data quality rule based on locking the selected data quality rule, and prevent changes to data quality rules that are not locked.

The rules management module may be configured to receive user input to delete the selected data quality rule when the selected data quality rule is locked and delete the selected data quality rule based on the user input to delete the selected data quality rule received when the selected data quality rule is locked. The rules management module also may be configured to receive user input to modify one or more attributes of the selected data quality rule when the selected data quality rule is locked and modify the one or more attributes of the selected data quality rule based on the user input to modify the one or more attributes of the selected data quality rule received when the selected data quality rule is locked.

In some implementations, the data quality job management module may be configured to present data quality rules for selection organized by industry, receive user input selecting data quality rules to migrate, and identify the data quality processing system to which the selected data quality rules are to be migrated. In these implementations, the data quality job management module may be configured to transform the selected data quality rules and data quality rules linked to the selected data quality rules to a format suitable for the identified data quality processing system, and send the transformed data quality rules to the identified data quality processing system.

The data quality job management module may be configured to identify, from among multiple, different data quality processing systems and based on user selection, the data quality processing system to which the data quality rules are to be migrated. The data quality job management module also may be configured to determine a format suitable for the identified data quality processing system and transform the data quality rules to the format suitable for the identified data quality processing system.

In some examples, the data quality job management module may be configured to allow the data quality processing system to access data to be profiled and cleansed and control the data quality processing system to execute the migrated data quality rules on the data to be profiled and cleansed. In these examples, the data quality job management module may be configured to monitor results of profiling and cleansing performed by the data quality processing system on the data to be profiled and cleansed and generate one or more reports that include information descriptive of profiling and cleansing performed by the data quality processing system based on the results of profiling and cleansing performed by the data quality processing system on the data to be profiled and cleansed. Further, in these examples, the data quality job management module may be configured to output the one or more generated reports and provide a cleansed version of the data to be profiled and cleansed.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 6, 7, 9, 11-14, and 17B are diagrams illustrating exemplary user interfaces.
FIG. 10 is a diagram of an exemplary data structure for data quality rules.
FIGS. 17C-23 are diagrams illustrating exemplary data quality reports.

DETAILED DESCRIPTION

Techniques are described for providing data quality services that unite data quality assets, processes, industry knowledge, and cleansing approaches. The data quality services may leverage a data quality rules management repository aligned with the creation, update and application of data quality rules that are tailored by industry. The data quality services also may leverage a data quality monitoring solution that tracks the state of data, to assist with assessment of the effectiveness of cleansing approaches and to identify root cause data quality issues.

Figure 1:
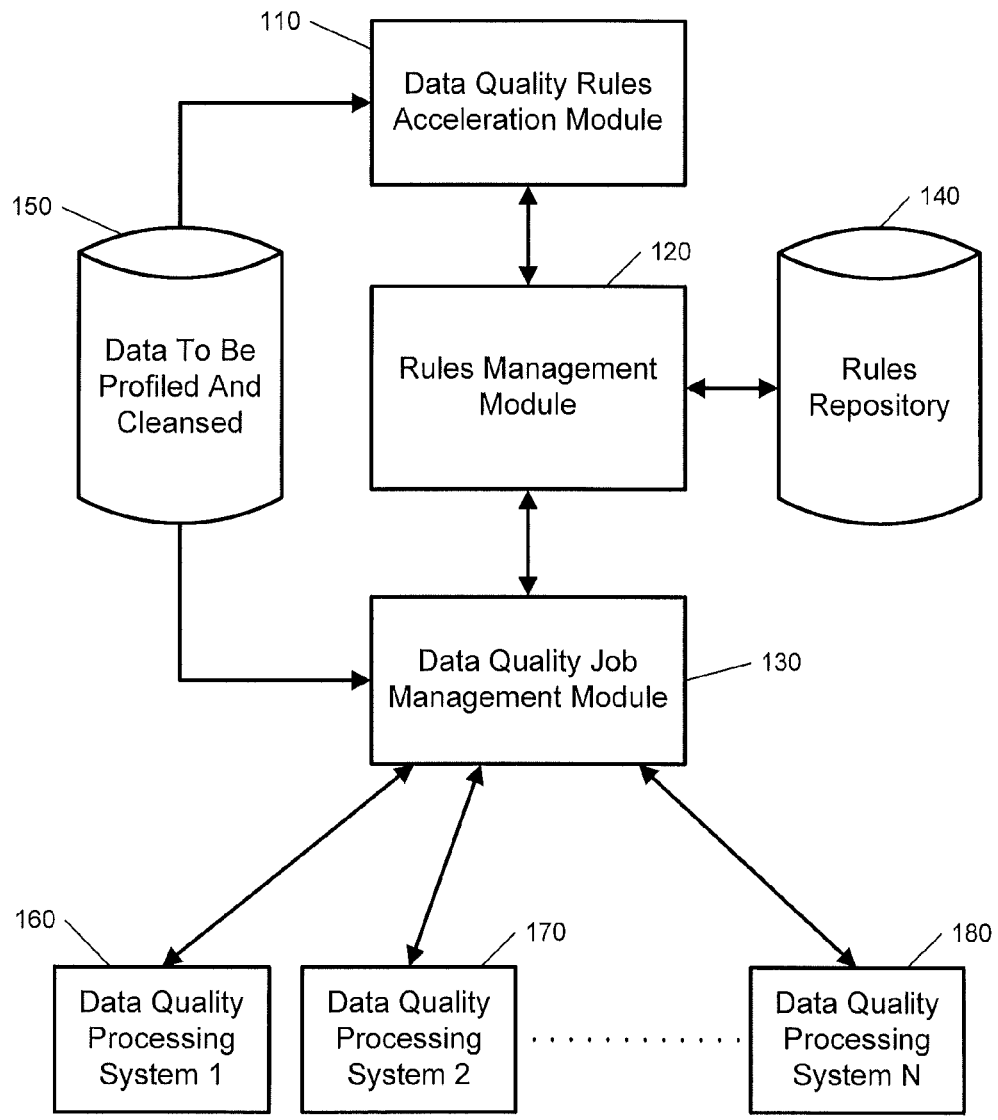
FIGS. 1, 3, 16, and 24 are diagrams of exemplary systems.

FIG. 1 illustrates an exemplary system 100 for data quality management. The system 100 includes a data quality rules acceleration module 110, a rules management module 120, and a data quality job management module 130. The data quality rules acceleration module 110, the rules management module 120, and the data quality job management module 130 may be separate hardware components of the system 100 or may be part of a single hardware component of the system 100. For instance, the data quality rules acceleration module 110, the rules management module 120, and the data quality job management module 130 may be a combination of hardware and software that operate on a single server system.

The system 100 also includes a rules repository 140 and a database 150. The rules repository 140 may be any type of data storage system that is capable of storing data quality rules that are used in data quality processes. The database 150 may be any type of database (or other data storage system) that is capable of storing data to be profiled and/or cleansed.

The system 100 further includes multiple, different data quality processing systems 160, 170, and 180. The multiple, different data quality processing systems 160, 170, and 180 may be any type of data quality processing system that is capable of performing profiling data quality operations and/or cleansing data quality operations based on data quality rules. The multiple, different data quality processing systems 160, 170, and 180 may be separate from the data quality job management module 130 and may represent data quality processing systems offered by multiple, different vendors.

The rules repository 140 may store any type of data quality rule used in assessing and/or correcting data quality issues. For instance, the rules repository 140 may store profiling data quality rules and cleansing data quality rules. Profiling data quality rules may include rules that flag and count data quality issues based on one or more conditions defined by the rule. Cleansing data quality rules may include rules that flag and correct data quality issues based on one or more conditions defined by the rule such that the corrected data now complies with the one or more conditions defined by the rule.

Profiling and cleansing data quality rules may define many different types of conditions that are used to perform data quality processing. For example, column data quality rules may check for conditions in columns of data, such as whether the column data is in a proper format and has a proper data type. Structure data quality rules may check for conditions related to structure of specific data entries, such as whether a specific value is stored in a data entry. Business data quality rules may check for conditions related to business rules, such as whether a value stored in a data entry is within a range that is appropriate for operation of the business (e.g., whether oil viscosity data is greater than a particular value).

In some implementations, the rules repository 140 may store linking data that links profiling data quality rules with cleansing data quality rules (e.g., linked pairs of data quality rules that have a profiling data quality rule linked to a cleansing data quality rule by the linking data). In these implementations, the linking data may link a profiling data quality rule with one or more cleansing data quality rules. For instance, the rules repository 140 may include multiple linked pairs of data quality rules that have a profiling data quality rule linked to a cleansing data quality rule by the linking data.

Based on the linking data, the profiling data quality rule may be executed in a coordinated manner with the one or more cleansing data quality rules. For instance, the profiling data quality rule may be executed to identify potential errors in data and then the one or more cleansing data quality rules may be executed against the data with potential errors in an attempt to correct the potential errors. The linking data may allow the one or more cleansing data quality rules to be executed in an automated manner (e.g., without user input) after the profiling data quality rule is executed and identifies potential errors in the data. The coordinated execution may provide increased automation in the data quality process and allow for end-to-end tracking of data profiling and data cleansing operations.

In some examples, the rules repository 140 stores data quality rules in a generic format that is independent of any system that executes the data quality rules. In these examples, the data quality rules are not stored in a vendor-specific format and need to be converted to a vendor-specific format prior to actually being executed on a data quality processing system provided by a vendor. Despite the additional conversion needed to execute the data quality rules, storing the data quality rules in a generic format may provide benefits because the data quality rules may be migrated to any system. The ability to use the same rules on any system may offer flexibility in which one or more data quality processing systems a company uses. Storing the data quality rules in a generic format also may ease transition when the company decides to change which data quality processing system the company uses because the data quality rules stored in the rules repository 140 are usable in the new data quality processing system after the proper conversion.

Further, in some implementations, the rules repository 140 stores data quality rules in a manner organized by industry. In these implementations, the data quality rules include data defining the conditions of the data quality rules and also include data defining to which one or more industries the data quality rules are relevant. The data quality rules may be relevant to only one industry, a subset of multiple industries, or all industries. By organizing the data quality rules by industry in the rules repository 140, members of a specific industry may take advantage of past industry expertise and easily view which data quality rules may be appropriate for their specific industry. Organization by vertical industry may be very helpful to quickly assess which data quality rules are beneficial to a company's business. Also, as industries change and new data quality rules are added (or existing data quality rules are modified), the rules repository 140 may maintain a current set of rules appropriate for each industry and continue to leverage industry expertise in organizing rules in the rules repository 140.

Figure 2:
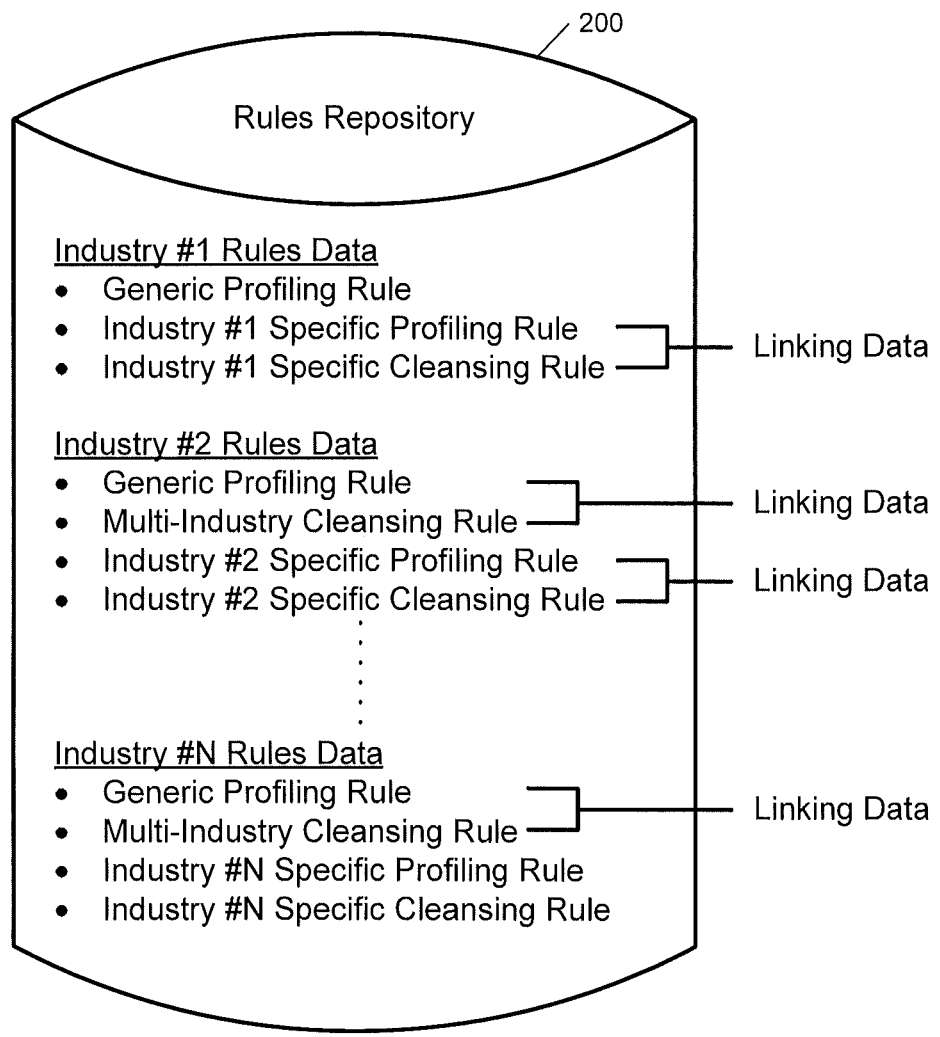
FIG. 2 is a diagram of an exemplary rules repository.

FIG. 2 illustrates an exemplary rules repository 200. As shown, the rules repository 200 stores data quality rules organized by industry. Although three industries are shown for brevity, data quality rules may be organized by more (perhaps many more) industries.

In the example shown in FIG. 2, rules data for a first industry includes a generic profiling data quality rule, a first industry-specific profiling data quality rule, a first industry-specific cleansing data quality rule, and linking data that links the first industry-specific profiling data quality rule with the first industry-specific cleansing data quality rule. Although three data quality rules are shown for brevity, the first industry may be associated with more (perhaps many more) data quality rules.

Rules data for a second industry includes the generic profiling data quality rule, a multi-industry cleansing data quality rule, a second industry-specific profiling data quality rule, a second industry-specific cleansing data quality rule, linking data that links the generic profiling data quality rule with the multi-industry cleansing data quality rule, and linking data that links the second industry-specific profiling data quality rule with the second industry-specific cleansing data quality rule. In this example, the generic profiling data quality rule is applicable to both the first industry and the second industry, but the multi-industry cleansing data quality rule is not applicable to the first industry and, therefore, not organized under the first industry. Also, although the generic profiling data quality rule has been listed under the first industry and the second industry, the rules repository 200 may not redundantly store the generic profiling data quality rule and, instead, may reference a single stored instance of the generic profiling data quality rule in both the first industry rules data and the second industry rules data. Further, although four data quality rules are shown for brevity, the second industry may be associated with more (perhaps many more) data quality rules.

Rules data for an nth industry includes the generic profiling data quality rule, the multi-industry cleansing data quality rule, an nth industry-specific profiling data quality rule, an nth industry-specific cleansing data quality rule, and linking data that links the generic profiling data quality rule with the multi-industry cleansing data quality rule. In this example, the generic profiling data quality rule is applicable to all of the first, second, and third industries, but the multi-industry cleansing data quality rule is applicable to the second and third industries. Also, although the generic profiling data quality rule and the multi-industry cleansing data quality rule have been listed under multiple industries, the rules repository 200 may not redundantly store the rules and, instead, may reference a single stored instance of the rules in the industry rules data. Further, although four data quality rules are shown for brevity, the third industry may be associated with more (perhaps many more) data quality rules.

Referring again to FIG. 1, the data quality rules acceleration module 110 assists in determining which data quality rules are appropriate for a particular set of data to be profiled and/or cleansed. For example, the data quality rules acceleration module 110 accesses data to be profiled and/or cleansed from the database 150 and analyzes the accessed data in an attempt to infer which data quality rules are appropriate for assessing quality of the accessed data. In this example, the data quality rules acceleration module 110 automatically, without user intervention, infers one or more data quality rules (e.g., profiling data quality rules and cleansing data quality rules) based on the analysis of the accessed data. The data quality rules acceleration module 110 may pass the inferred rules to the rules management module 120 for suggestion to a user and/or storage in the rules repository 140.

The rules management module 120 assists in management of data quality rules stored in the rules repository 140. For example, the rules management module 120 may present user interfaces that allow a user to provide input in managing data quality rules that are stored in the rules repository 140. In this example, the rules management module 120 may receive user input to add new data quality rules to the rules repository 140, modify existing data quality rules stored in the rules repository 140, link profiling data quality rules with cleansing data quality rules, and organize data quality rules by industry to allow users to perceive data quality rules that are relevant for various, different industries.

The data quality job management module 130 receives data quality rules from the rules management module 120 and migrates the received data quality rules to one or more of the data quality processing systems 160, 170, and 180. For instance, the data quality job management module 130 converts data quality rules stored in the rules repository 140 in a generic format to a vendor-specific format used by one or more of the data quality processing systems 160, 170, and

180. The data quality job management module 130 also allows one or more of the data quality processing systems 160, 170, and 180 to access data to be profiled and/or cleansed from the database 150 and controls one or more of the data quality processing systems 160, 170, and 180 to execute the migrated data quality rules on the data to be profiled and/or cleansed from the database 150. The data quality job management module 130 monitors execution of the migrated data quality rules on the data to be profiled and/or cleansed from the database 150 and tracks information related to the execution throughout data quality processing. The data quality job management module 130 also may return cleansed data back to the database 150 and may provide reports based on the monitoring of the execution of the migrated data quality rules on the data to be profiled and/or cleansed from the database 150.

Figure 3:
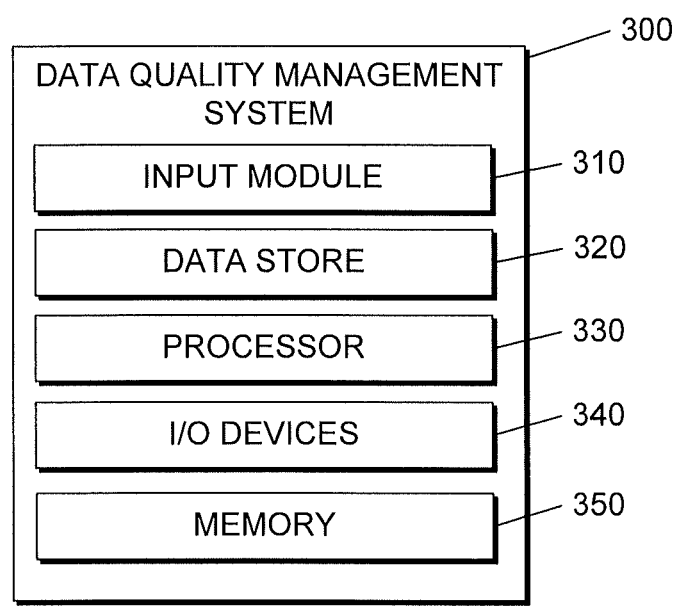

FIG. 3 illustrates an exemplary data quality management system 300. The system 300 includes an input module 310, a data store 320, one or more processors 330, one or more I/O (Input/Output) devices 340, and memory 350. The input module 320 may be used to input any type of information used by data quality services performed by the system 300. For example, the input module 310 may be used to receive input defining parameters for rule discovery, input defining new data quality rules, input defining modification of rules data stored in a rules repository, input selecting data quality rules to migrate to a data quality processing system, and/or input related to monitoring and reporting results of data quality operations. In some implementations, data from the input module 310 is stored in the data store 320. The data included in the data store 320 may include, for example, data quality rules and data to be profiled and/or cleansed.

In some examples, the data store 320 may be a relational database that logically organizes data into a series of database tables. Each database table in the data store 320 may arrange data in a series of columns (where each column represents an attribute of the data stored in the database) and rows (where each row represents attribute values). In some implementations, the data store 320 may be an object-oriented database that logically or physically organizes data into a series of objects. Each object may be associated with a series of attribute values. In some examples, the data store 320 may be a type of database management system that is not necessarily a relational or object-oriented database. For example, a series of XML (Extensible Mark-up Language) files or documents may be used, where each XML file or document includes attributes and attribute values. Data included in the data store 320 may be identified by a unique identifier such that data related to a particular process may be retrieved from the data store 320.

The processor 330 may be a processor suitable for the execution of a computer program such as a general or special purpose microprocessor, and any one or more processors of any kind of digital computer. In some implementations, the system 300 includes more than one processor 330. The processor 330 may receive instructions and data from the memory 350. The memory 350 may store instructions and data corresponding to any or all of the components of the system 300. The memory 350 may include read-only memory, random-access memory, or both.

The I/O devices 340 are configured to provide input to and output from the system 300. For example, the I/O devices 340 may include a mouse, a keyboard, a stylus, or any other device that allows the input of data. The I/O devices 340 may also include a display, a printer, or any other device that outputs data.

Figure 4:
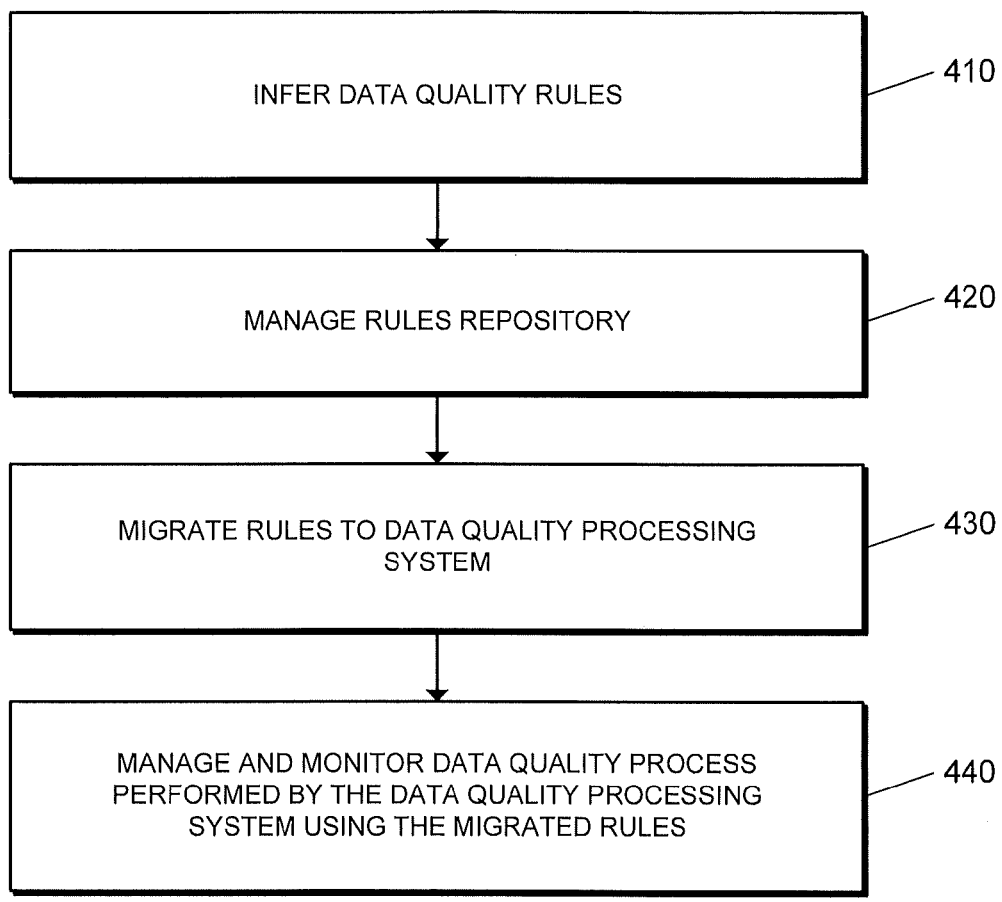
FIGS. 4, 5, 8, 15, and 17A are flowcharts of exemplary processes.

FIG. 4 illustrates a process 400 for managing data quality processes. The operations of the process 400 are described generally as being performed by the system 300. In some implementations, operations of the process 400 may be performed by one or more processors included in one or more electronic devices.

The system 300 infers data quality rules (410). For example, the system 300 accesses data to be profiled and/or cleansed, accesses data defining data quality rules in a repository, and analyzes the accessed data to be profiled and/or cleansed with the data defining data quality rules. In this example, the system 300 attempts to infer which data quality rules are appropriate for assessing quality of the accessed data to be profiled and/or cleansed based on the analysis.

In some implementations, the analysis used to infer data quality rules may include statistical analysis of the data to be profiled and/or cleansed. In these implementations, the system 300 may analyze the data to be profiled and/or cleansed to identify statistical outliers in terms of data values, data format, or other attributes. The system 300 identifies statistical outliers and determines whether the statistical outliers are indicators of data quality rules that are appropriate for the data to be profiled and/or cleansed. The system 300 may consider the rarity of the statistical outliers identified in the data and/or whether the statistical outliers identified in the data correspond to data quality rules that are available in a rules repository. For example, the system 300 may determine that a field of a data structure has only one negative value in one million records. In this example, the system 300 may determine that a data quality rule that checks whether data in the field of the data structure has a positive value is appropriate because a negative value appears in the field of the data structure very infrequently (e.g., below a threshold level of frequency) and/or a data quality rule that checks whether data is positive is available in the rules repository.

In some examples, the analysis used to infer data quality rules may include comparing attribute headings of the data to be profiled and/or cleansed with names and/or predefined data associated with data quality rules stored in the rules repository. In these examples, the system 300 may determine that a data quality rule is appropriate for a column of data in a database based on a comparison of a name for the column of data revealing that the name for the column of data matches (or is similar to) a name for the data quality rule or that metadata for the data quality rule indicates that the data quality rule is typically appropriate for columns of data that have the name for the column of data. For instance, the database may include a column named "gender" and the system 300 may determine that a data quality rule that checks whether values stored in the column include a value of "M," "Male," "F," or "Female" because the data quality rule is named "gender test" data quality rule (which matches the "gender" column name) or metadata for the data quality rule indicates that the data quality rule is typically appropriate for columns of data that have "gender" in the name.

Further, the analysis used to infer data quality rules may include running data quality rules against the data to be profiled and/or cleansed and examining the results. For instance, the system 300 may run all data quality rules stored in a rules repository against the data to be profiled and/or cleansed and determine a percentage of the data identified as having a potential error for each of the data quality rules. The system 300 then may compare the determined percentages to one or more thresholds that define typical or expected error rates and determine whether each rule is producing typical or expected error rates for the data to be profiled and/or cleansed. When the system 300 determines that a rule is producing typical or expected error rates (e.g., relatively low, but not zero) based on the comparison, the system 300 infers that the rule may be appropriate for the data to be profiled and/or cleansed. When the system 300 determines that a rule is producing atypical or unexpected error rates (e.g., relatively high error rate) based on the comparison, the system 300 infers that the rule may be inappropriate for the data to be profiled and/or cleansed.

The analysis used to infer data quality rules may include evaluation of a combination of techniques discussed throughout this disclosure. For instance, the system 300 may compare attribute headings of the data to be profiled and/or cleansed with names and/or predefined data associated with data quality rules stored in the rules repository. When the system 300 finds a match based on the comparison, the system 300 may run the matching data quality rule against the data to be profiled and/or cleansed, evaluate the results, and only infer that the matching data quality rule is appropriate when the system 300 determines that the matching data quality rule is producing typical or expected error rates.

Figure 5:
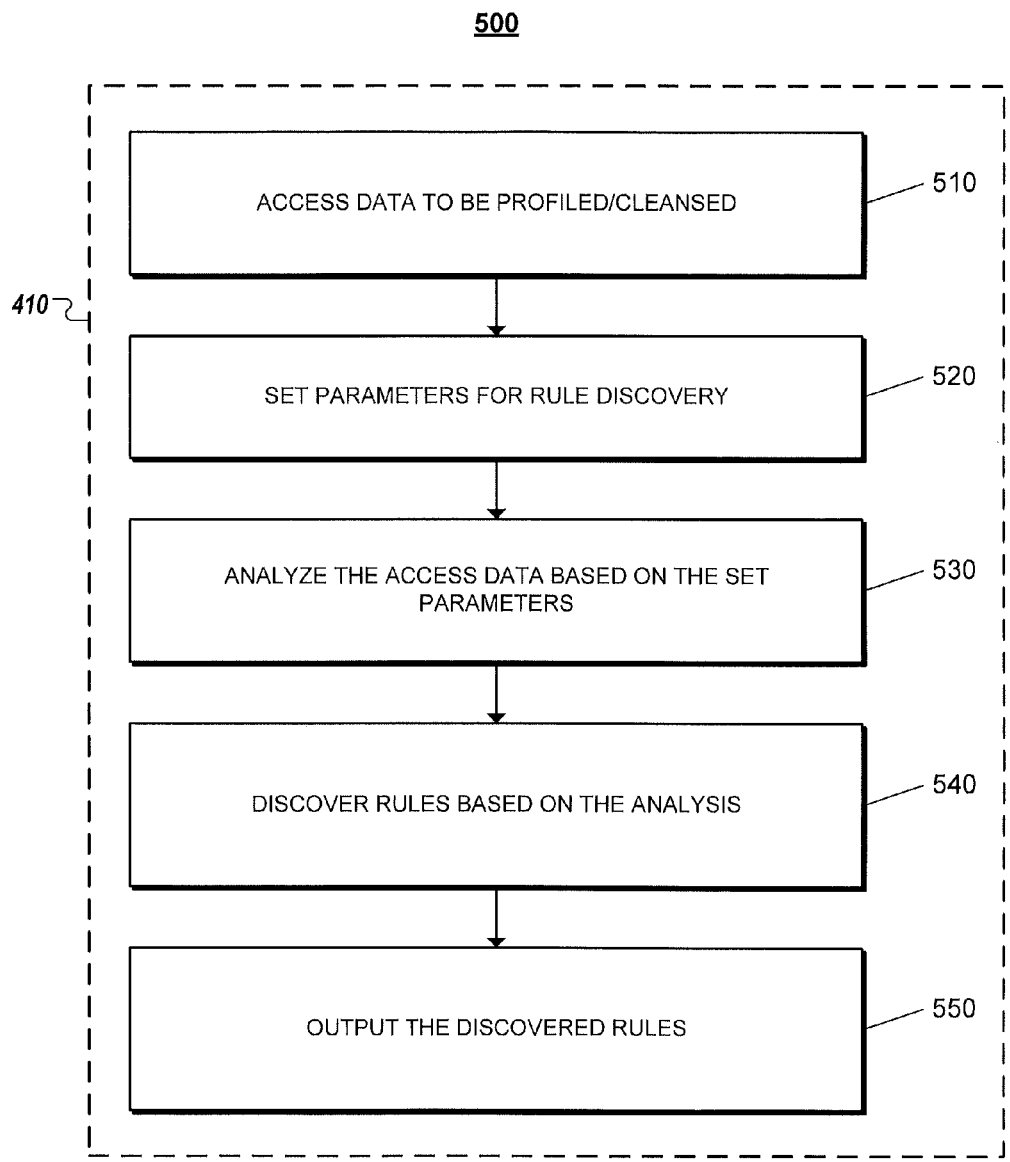

FIG. 5 illustrates a process 500 for inferring data quality rules. The process 500 may be used in inferring data quality rules referenced above with respect to reference numeral 410. The operations of the process 500 are described generally as being performed by the system 300. In some implementations, operations of the process 500 may be performed by one or more processors included in one or more electronic devices.

The system 300 accesses data to be profiled and/or cleansed (510). For example, the system 300 retrieves data to be profiled and/or cleansed for a database through one or more database queries. The system 300 also may access data from a file, such as a spreadsheet file or a comma-separated values file. The system 300 may determine which data to access based on input provided by a user.

Figure 6:
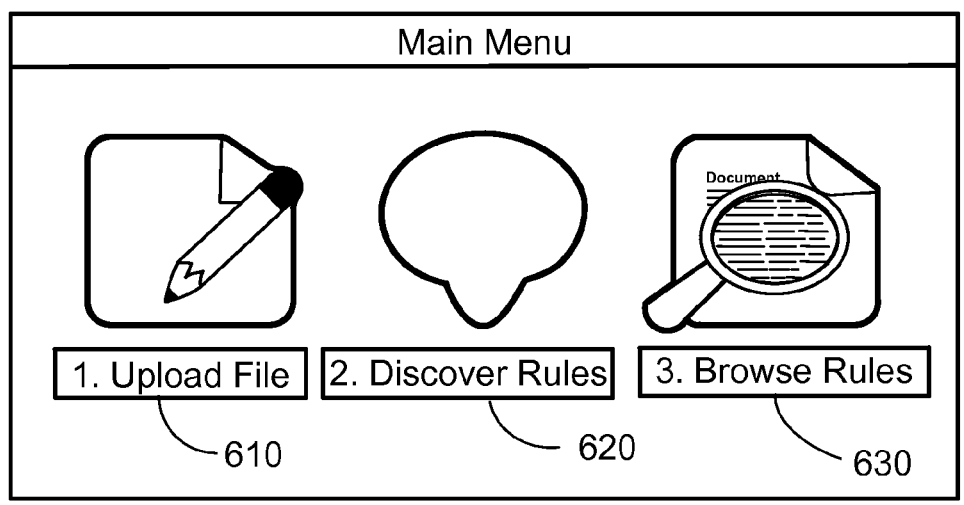

FIG. 6 illustrates an exemplary user interface 600 that may be used in discovering data quality rules. The system 300 may use the user interface 600 to receive input identifying data to be profiled and/or cleansed and then access the identified data to be profiled and/or cleansed as discussed above with respect to reference numeral 510. As shown, the user interface 600 includes an upload file button 610, a discover rules button 620, and a browse rules button 630. The upload file button 610, when pressed, causes an additional interface to be displayed that allows a user to locate and upload a comma-separated values file that includes data to be profiled and/or cleansed. The discover rules button 620, when pressed, causes the system 300 to initiate a process to discover data quality rules that are appropriate for the data included in the comma-separated values file uploaded using the upload file button 610. The browse rules button 630, when pressed, causes the system 300 to display data quality rules discovered through the discovery process initiated using the discover rules button 620.

Referring again to FIG. 5, the system 300 sets parameters for rule discovery (520). For instance, the system 300 may set parameters that define how rule discovery takes place in analyzing data to be profiled and/or cleansed. The parameters may relate to a level of confidence the system 300 must have in discovering a rule and preference for how rules are discovered and/or what types of rules are discovered. The system 300 may receive user input defining parameters for rule discovery and set the parameters based on the receive user input. The system 300 may set parameters for each rule discovery process performed or may set parameters that are applied to multiple rule discovery processes performed on multiple data files.

Figure 7:
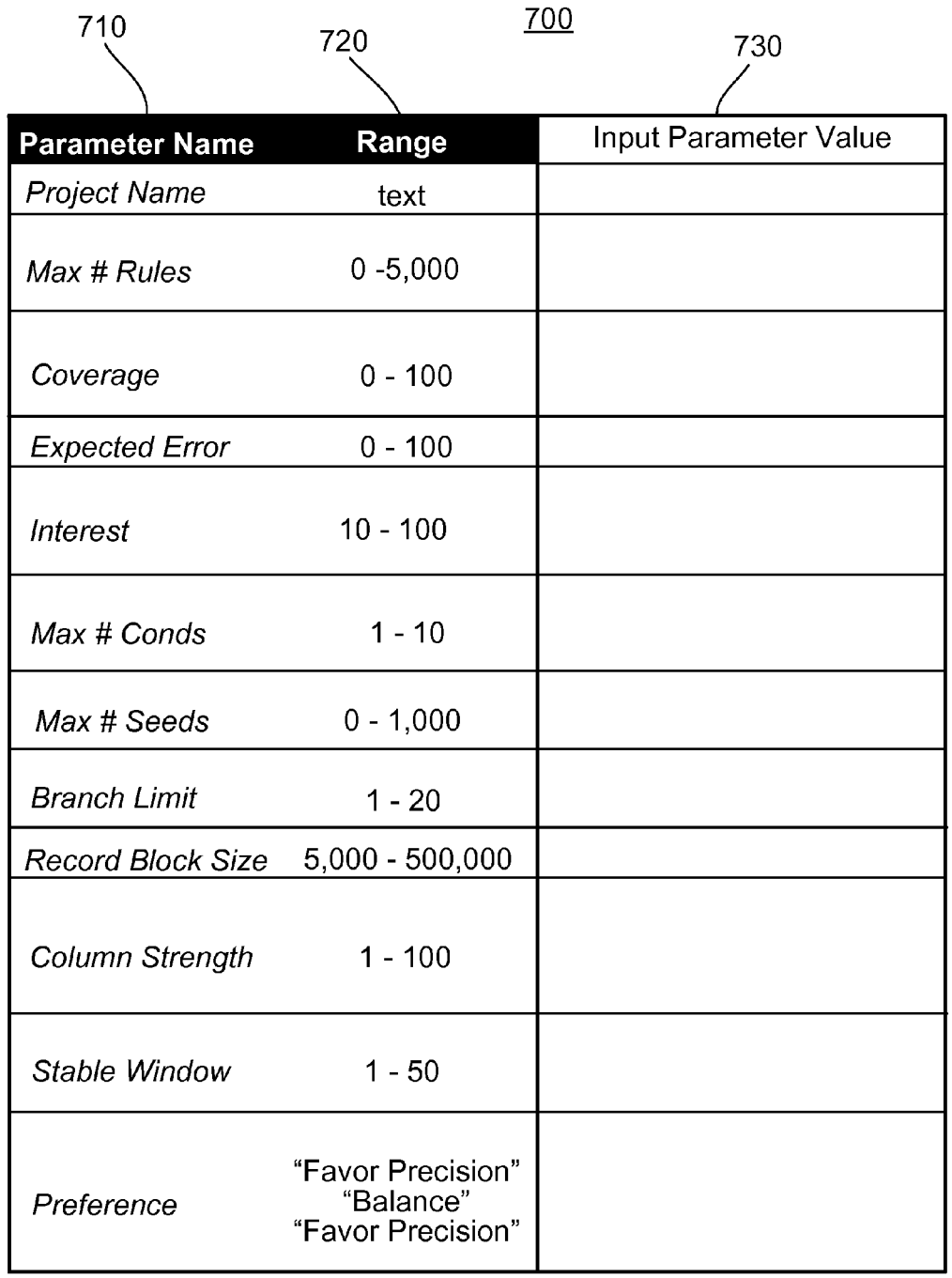

FIG. 7 illustrates an exemplary user interface 700 that may be used to receive input defining parameters for rule discovery. The system 300 may use the user interface 700 to receive input defining parameters for rule discovery and then set parameters for rule discovery as discussed above with respect to reference numeral 520. The system 300 may display the user interface 700 in response to receiving user selection of the discover rules button 620 in the user interface 600.

The user interface 700 includes a parameter name column 710, a range column 720, and input parameter value column 730. The parameter name column 710 identifies the name of each parameter that may be set for rule discovery. The range column 720 identifies a range of permissible values for each parameter that may be set for rule discovery. The input parameter value column 730 provides an input control for each parameter that may be set for rule discovery and that allows a user to provide user input to set the corresponding parameter. Although the input controls shown in the input parameter value column 730 are text box input controls that receive text input, other types of inputs controls may be used in the input parameter value column 730, such as radio buttons, drop-down menus, etc.

As shown in the user interface 700, several parameters may be set for rule discovery. For instance, a Project Name parameter may be set. The Project Name parameter has a range of any text and defines the name of the project to be created from the rules discovery process. A Maximum Number of Rules parameter may be set. The Maximum Number of Rules parameter has a range of zero to five thousand and defines the maximum number of rules that the system 300 will return as part of the rules discovery process (e.g., an upper bound). In some implementations, the system 300 may determine whether the number of potential rules discovered exceeds the Maximum Number of Rules parameter and, if so, select a number of rules that corresponds to the Maximum Number of Rules parameter. The system 300 may select rules that have the highest confidence of being appropriate and/or rules that have the highest potential impact on data quality.

A Coverage parameter may be set. The Coverage parameter has a range of zero to one hundred and defines the percentage of data that a rule must cover in order for the system 300 to return the rule to the user. Lower coverage will return more rules, but will require longer discovery time.

An Expected Error parameter may be set. The Expected Error parameter has a range of zero to one hundred and defines the expected percentage of error in the dataset. The system 300 may compare the Expected Error parameter to a percentage of error computed for a particular data quality rule and discover the particular data quality rule as being appropriate when the comparison reveals that the computed percentage of error is within a threshold of the Expected Error parameter.

An Interest parameter may be set. The Interest parameter has a range of ten to one hundred and defines the minimum level of interest for a rule (as determined by whether the occurrence of the rule is due to random chance). Ten is the lowest level of interest and a rule must exceed this threshold in order for it to be returned.

A Maximum Number of Conditions parameter may be set. The Maximum Number of Conditions parameter has a range of one to ten and defines the maximum number of conditions allowed on the left hand side of the rule. Rules having more conditions than the Maximum Number of Conditions parameter are not considered as part of the rule discovery process.

A Maximum Number of Seeds parameter may be set. The Maximum Number of Seeds parameter has a range of zero to one thousand and defines the maximum number of combinations of two attributes to consider. A larger number will result in longer discovery time.

A Branch Limit parameter may be set. The Branch Limit parameter has a range of one to twenty and defines the maximum number of new rules to generate from an existing rule if it needs to be refined during the discovery process. A Record Block Size parameter may be set. The Record Block Size parameter has a range of five thousand to five hundred thousand and defines the maximum number of records to examine at a time.

A Column Strength parameter may be set. The Column Strength parameter has a range of one to one hundred and defines the minimum strength (e.g., correlation) that must exist between in order for the system 300 to consider them as a potential attribute pair from which to discover rules. A lower strength will result in more potential attribute pairs.

A Stable Window parameter may be set. The Stable Window parameter has a range of one to fifty and defines the window size over which the system 300 will determine whether any more rules can be discovered.

A Preference parameter may be set. The Preference parameter has a range of "Favor Recall," "Balance," and "Favor Precision." "Favor Recall" causes the system 300 to focus on discovering rules that can detect the largest number of defects (at the expense of precision). "Favor Precision" causes the system 300 to focus on rules with higher precision (at the expense of recall). "Balance" causes the system 300 to pursue a balanced strategy during rules discovery.

Referring again to FIG. 5, the system 300 analyzes the accessed data based on the set parameters for rule discovery (530). For example, the system 300 analyzes the accessed data to be profiled and/or cleansed based on the parameters set using the user interface 700. In this example, the system 300 analyzes the accessed data and the potential data quality rules to attempt to identify whether particular data quality rules are appropriate to discover in accordance with the preferences defined by the parameters set using the user interface 700. For instance, the system 300 may identify potential data quality rules that have a number of conditions that is less than or equal to the Maximum Number of Conditions parameter. The system 300 then may analyze the accessed data to be profiled and/or cleansed to determine a percentage of coverage of each of the identified data quality rules and compares the percentage of coverage to the Coverage parameter. Any combination of the parameters set using the user interface 700 may be considered by the system 300 in performing rule discovery.

The system 300 discovers rules based on the analysis (540). For instance, the system 300 identifies a set of data quality rules that meet the parameters set using the user interface 700 and discovers the identified set of data quality rules as being potentially appropriate for the accessed data to be profiled and/or cleansed. In the example described above with respect to reference numeral 530, the system 300 identifies a set of data quality rules that meet the Coverage parameter based on the comparison of the percentage of coverage to the Coverage parameter. The system 300 then determines a number of data quality rules included in the identified set of data quality rules, compares the number of data quality rules included in the identified set of data quality rules to the Maximum Number of Rules parameter, and discovers the identified set of data quality rules when the comparison reveals that the number of data quality rules included in the identified set of data quality rules is less than or equal to the Maximum Number of Rules parameter. When the comparison reveals that the number of data quality rules included in the identified set of data quality rules is greater than the Maximum Number of Rules parameter, the system 300 limits the identified set of data quality rules to the Maximum Number of Rules based on, for example, highest percentage of coverage. As mentioned above, any combination of the parameters set using the user interface 700 may be considered by the system 300 in performing rule discovery.

The system 300 outputs the discovered rules (550). For instance, the system 300 displays the discovered rules, stores the discovered rules in electronic storage (e.g., the rules repository 140), sends the discovered rules in an electronic communication (e.g., an electronic mail message), prints a copy of the discovered rules using a printing device, or performs any other output operation that allows a user to perceive the discovered rules and use the discovered rules in a later data quality processing operation. The system 300 may display the discovered rules in response to receiving user selection of the browse rules button 630 in the user interface 600.

Referring again to FIG. 4, the system 300 manages a rules repository (420). For instance, the system 300 controls storage of and manages profiling data quality rules stored in the rules repository, cleansing data quality rules stored in the rules repository, and linking data stored in the rules repository that links profiling data quality rules with cleansing data quality rules. The system 300 may manage the profiling data quality rules, the cleansing data quality rules, and the linking data based on user input received through one or more user interfaces displayed by the system 300. The system 300 also may organize the profiling data quality rules and the cleansing data quality rules by industry to allow a user to select a particular industry and receive a subset of the profiling data quality rules and the cleansing data quality rules that are relevant to the particular industry.

Figure 8:
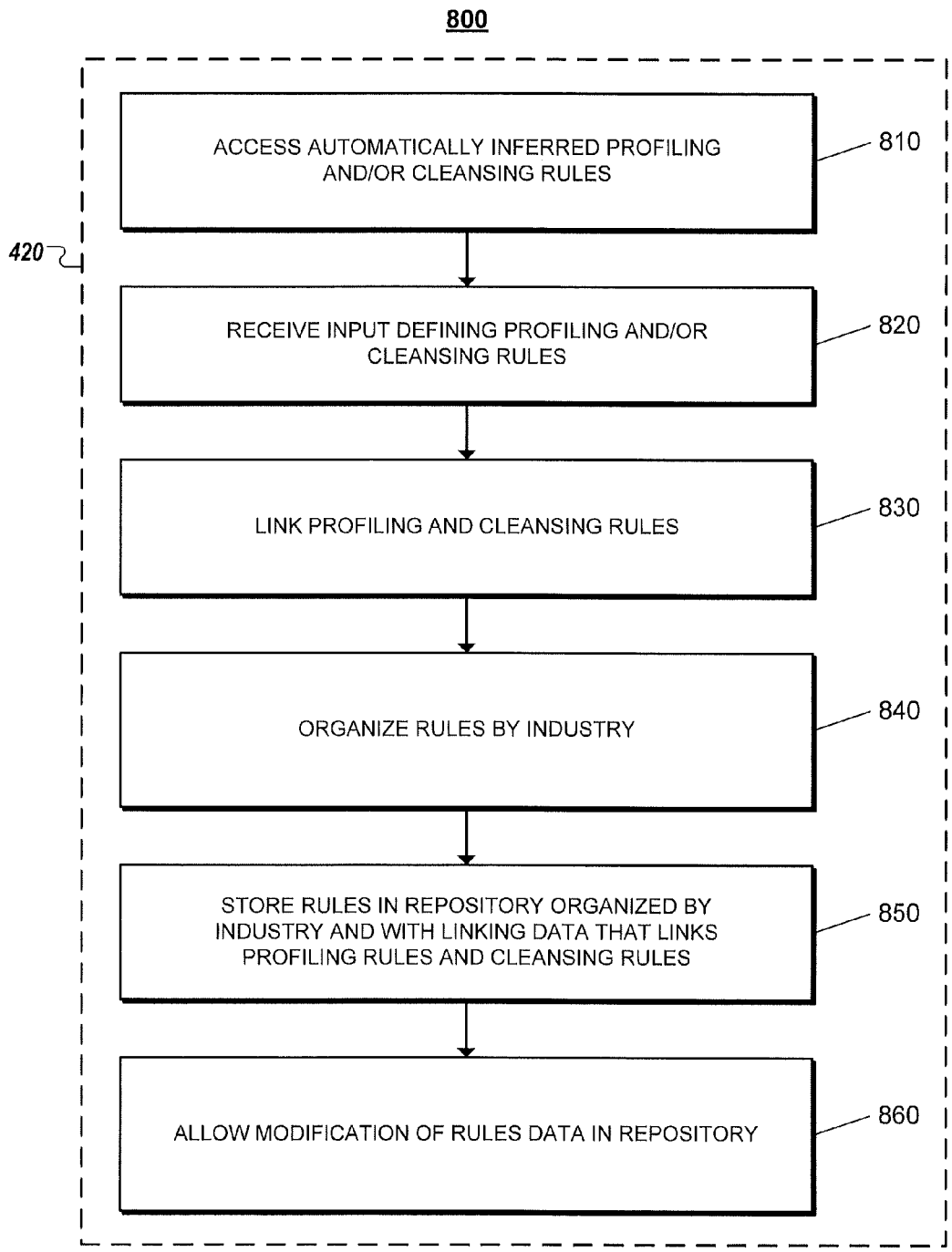

FIG. 8 illustrates a process 800 for managing a rules repository. The process 800 may be used in managing a rules repository referenced above with respect to reference numeral 420. The operations of the process 800 are described generally as being performed by the system 300. In some implementations, operations of the process 800 may be performed by one or more processors included in one or more electronic devices.

The system 300 accesses automatically inferred profiling and/or cleansing data quality rules (810). For instance, the system 300 accesses profiling and/or cleansing data quality rules that were inferred as discussed above with respect to reference numeral 410 and/or profiling and/or cleansing data quality rules that were discovered as part of the process 500 discussed above. The system 300 may access the automatically inferred profiling and/or cleansing data quality rules from electronic storage (e.g., a rules repository or temporary storage).

The system 300 receives input defining profiling and/or cleansing data quality rules (820). For example, the system 300 displays a user interface that allows a user to define a data quality rule and receives user input entered into the displayed user interface. In this example, the system 300 may receive user input defining a name of a data quality rule, whether the data quality rule is a profiling or cleansing data quality rule, conditions of the data quality rule, and any other parameter that may be used in defining data quality rules.

FIG. 9 illustrates an exemplary user interface 900 that may be used to receive input defining profiling and/or cleansing rules. The system 300 may use the user interface 900 to receive input defining profiling and/or cleansing data quality rules as discussed above with respect to reference numeral 820. As shown, the user interface 900 includes input controls that allow a user to define a new data quality rule.

The user interface 900 includes a Rule Name text box which receives text input that defines a name of the new data quality rule. The user interface 900 also includes a Rule Type drop-down menu control that receives user input selecting whether the new data quality rule is a profiling rule or a cleansing rule. The user interface 900 further includes a DQ Rule Type drop-down menu control that receives user input selecting whether the new data quality rule is a column rule, a structure rule, or a business rule.

In addition, the user interface 900 includes a Condition text box which receives text input that defines one or more conditions for the new data quality rule. The user interface 900 also includes a New Value text box which receives text input that defines one or more parameters for setting a new value when the new data quality rule is a cleansing data quality rule and data needs to be cleansed. The user interface 900 further includes an In Source text box which receives text input that defines a source (e.g., database) for the new data quality rule.

The user interface 900 includes Null, Key, Created in IA, and Transferred check boxes. The Created in IA check box indicates whether the new data quality rule was created in another data quality management and/or processing system. In this example, the Created in IA check box indicates whether the new data quality rule was created in the Information Analyzer product provided by IBM Corporation. Information Analyzer is one example of another data quality management and/or processing system in which new data quality rules may be created. Other types of data quality management and/or processing system may be used.

The Null, Key, and Transferred check boxes receive user input selecting whether or not the new data quality rule is null, is key, and has been transferred. The user interface 900 also includes a Formatting text box which receives text input that defines information related to formatting for the new data quality rule. The user interface 900 further includes a Join Type text box which receives text input that defines information related to join type for the new data quality rule.

The user interface 900 includes a Cancel button and a Save button. The Cancel button cancels the process of adding a new rule and ends the process of adding a new rule without adding a new rule to the rules repository. The Save button causes a new rule to be saved in the rules repository based on the input provided in the user interface 900.

Referring again to FIG. 8, the system 300 links profiling and cleansing data quality rules (830). For example, the system 300 receives user input selecting a cleansing data quality rule to link with a profiling data quality rule. In this example, the system 300 links the selected cleansing data quality rule with the profiling data quality rule. The system 300 may receive user input defining many pairs of profiling and cleansing data quality rules to link together such that the system 300 created many pairs of linked profiling and cleansing data quality rules. The system 300 also may link a single profiling data quality rule with multiple cleansing data quality rules or may link multiple profiling data quality rules with a single cleansing data quality rule.

The system 300 organizes data quality rules by industry (840). For example, the system 300 receives user input selecting an industry and profiling and/or cleansing data quality rules that are appropriate for the selected industry. In this example, the system 300 organizes the selected profiling and/or cleansing data quality rules within the selected industry. The system 300 may receive user input defining many profiling and cleansing data quality rules to organize within the selected industry and may organize data quality rules across many, different industries such that a user is able to perceive data quality rules that are appropriate for an industry in which the user is interested in assessing quality of data. The system 300 may organize a single data quality rule within a single industry, within multiple, different industries, or within all industries.

The system 300 stores, in a rules repository, profiling and cleansing data quality rules organized by industry and with linking data that links profiling and cleansing data quality rules (850). For instance, the system 300 stores automatically inferred profiling and cleansing data quality rules that were accessed and stores profiling and cleansing data quality that were defined by input received by the system 300. The system 300 may present the automatically inferred profiling and cleansing data quality rules to a user for selection and store only those automatically inferred profiling and cleansing data quality rules selected by the user as being appropriate.

The system 300 also stores linking data that links profiling and cleansing data quality rules. For example, the system 300 stores linking data for profiling and cleansing data quality rules that were linked based on user input received by the system 300. In this example, the system 300 may store linking data that creates many linked pairs of profiling and cleansing data quality rules in the rule repository. The system 300 may store linking data separate from the data quality rules or as a parameter of each data quality rule that includes an identifier for another data quality rule to which the data quality rule or a null value if the data quality rule is not linked to another data quality rule.

The system 300 further stores industry data that organizes profiling and cleansing data quality rules by industry. For example, the system 300 stores industry data for profiling and cleansing data quality rules based on organization of profiling and cleansing data quality rules discussed above with respect to reference numeral 840. In this example, the system 300 may store industry data that organizes profiling and cleansing data quality rules in the rule repository with respect to many, different industries. The system 300 may store industry data separate from the data quality rules or as a parameter of each data quality rule that indicates which one or more industries the data quality rule is organized within.

FIG. 10 illustrates an exemplary data structure 1000 that may be used to store profiling and/or cleansing rules. As shown, the data structure 1000 includes an Identifier field 1005, an In_Source field 1010, a Rule_Name field 1015, a Condition field 1020, a Rule_Type field 1025, an IsNull field 1030, an IsKey field 1035, a Formatting field 1040, a Created_In_IA field 1045, a Transferred field 1050, an Industry field 1055, a Link_Data field 1060, and a DQ_Rule_Type field 1065. The Identifier field 1005 stores data defining a unique identifier for the data quality rule.

The In_Source field 1010 stores data defining a source (e.g., database) for the data quality rule. The Rule Name field 1015 stores data defining a name of the data quality rule. The Condition field 1020 stores data defining one or more conditions for the data quality rule. The Rule_Type field 1025 stores data defining whether the data quality rule is a profiling rule or a cleansing rule.

The IsNull field 1030 stores data defining whether or not the data quality rule is null. The IsKey field 1035 stores data defining whether or not the data quality rule is key. The Formatting field 1040 stores data defining information related to formatting for the data quality rule.

The Created_In_IA field 1045 stores data defining whether or not the data quality rule was created in another data quality management and/or processing system. The Transferred field 1050 stores data defining whether or not the data quality rule has been transferred. The DQ_Rule_Type field 1065 stores data defining whether the data quality rule is a column rule, a structure rule, or a business rule.

The Industry field 1055 stores data defining one or more industries the data quality rule is organized within. The Industry field 1055 may be queried by the system 300 to generate a list of data quality rules are appropriate for a particular industry.

The Link_Data field 1060 stores linking data defining one or more other data quality rules to which the data quality rule is linked. The Link_Data field 1060 may store an identifier of one or more other data quality rules to which the data quality rule is linked. The system 300 may reference the Link_Data field 1060 to determine whether a data quality rule is linked to another data quality rule and, if so, which other data quality rule.

Referring again to FIG. 8, the system 300 allows modification of rules data in the rules repository (860). For example, the system 300 allows a user to delete data quality rules, modify parameters of data quality rules, change or add linking data for data quality rules, and change industry organization for data quality rules. In this example, the system 300 may display user interfaces that allow a user to provide input modifying rules data in the rules repository and modify the rules data (e.g., profiling and cleansing data quality rules data, linking data, and industry data) based on user input received through the user interfaces. The system 300 may allow users to modify any parameters associated with the rules repository and the rules data stored in the rules repository.

FIG. 11 illustrates an exemplary user interface 1100 that may be used in searching for data quality rules. The system 300 may use the user interface 1100 to receive input that allows modification of rules data in the rules repository as discussed above with respect to reference numeral 860. As shown, the user interface 1100 includes a Rule Name text box that receives user input defining a search query for data quality rules in the rules repository. The search query in the Rule Name text box may be used to search for data quality rules that have a name matching the search query.

The user interface 1100 also includes a Back button that cancels the process of searching for data quality rules and returns to a prior user interface displayed in performing data quality rules management. The user interface 1100 further includes a Search button that causes the system 300 to perform a search for data quality rules in the rules repository based on the search query received in the Rule Name text box. The system 300 identifies data quality rules in the rules repository that match the search query based on performance of the search.

FIG. 12 illustrates an exemplary user interface 1200 that may be used to display search results when searching for data quality rules. The system 300 may use the user interface 1200 to receive input that allows modification of rules data in the rules repository as discussed above with respect to reference numeral 860. As shown, the user interface 1200 presents a list of data quality rules identified in a search performed based on input received through the interface 1100. In this example, the list includes four data quality rules that match the search query received through the interface 1100. The user interface 1200 may include more or fewer (perhaps none) matching data quality rules depending on results of the search.

The user interface 1200 also includes selection radio buttons that allow a user to select one or more of the data quality rules included in the list. The user interface 1200 further includes a Back button and a Lock Rule button. The Back button cancels the process of reviewing data quality rules returned as search results and returns to the user interface 1100. The Lock Rule button causes the system 300 to lock any of the data quality rules included in the list of results that were selected using the radio buttons. For example, the system 300 locks one or more selected data quality rules based on the selection of the Lock Rule button. In this example, the system 300 allows changes to the one or more locked data quality rule based on the locking and prevents changes to data quality rules that are not locked. The system 300 also prevents locked data quality rules from being used in a data quality process because the locked data quality rules are possibly being modified. The system 300 further allows unlocked data quality rules to be used in a data quality process because the unlocked data quality rules are not being modified.

Figure 13:
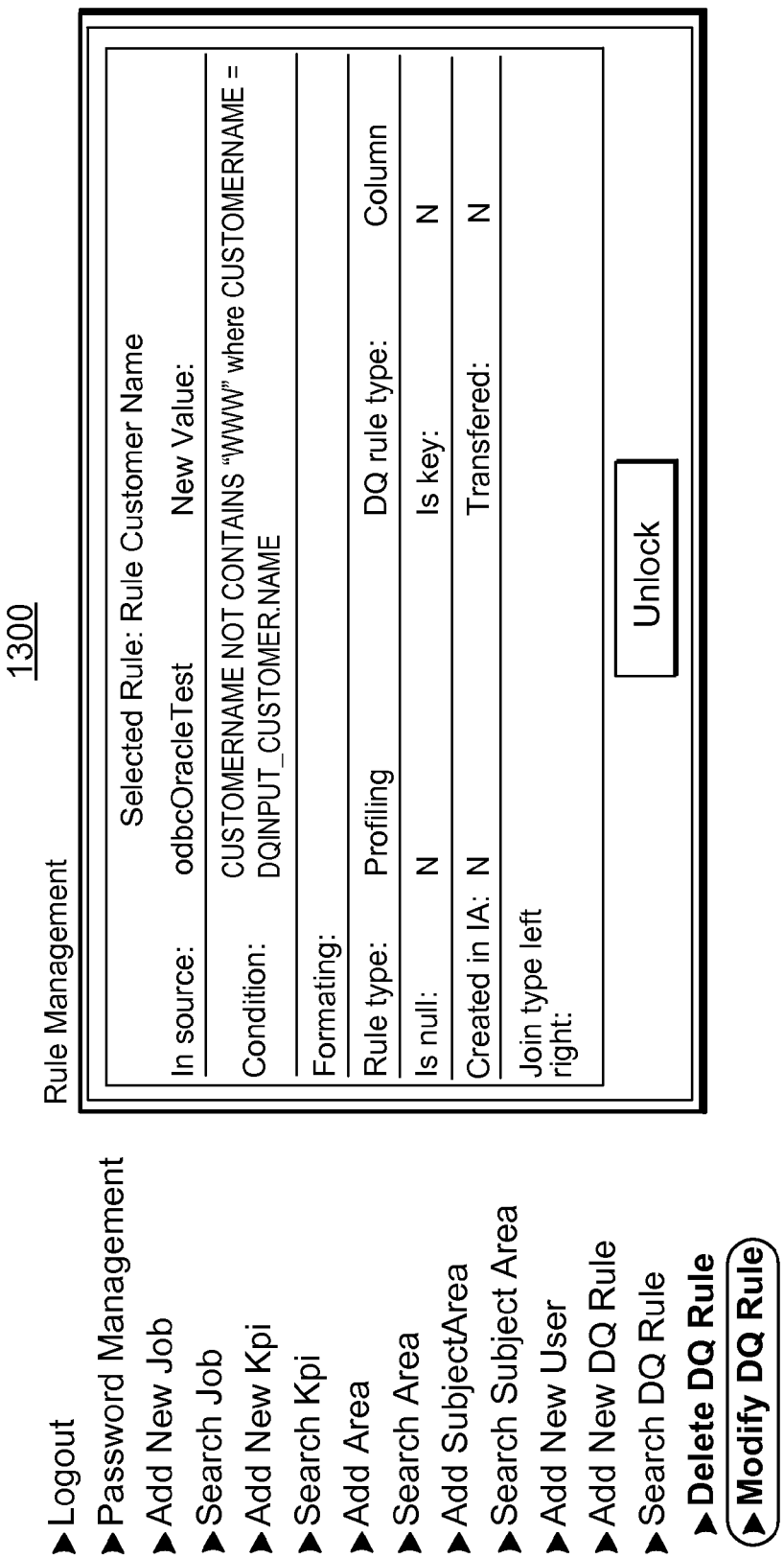

FIG. 13 illustrates an exemplary user interface 1300 that may be used to display a selected and locked data quality rule. The user interface 1300 may be displayed based on selection of the radio button associated with the Rule Customer Name in the user interface 1200 and then selection of the Lock Rule button in the user interface 1200. The user interface 1300 displays attributes of the locked data quality rule and includes an Unlock button that causes the system 300 to unlock the data quality rule and return the user interface 1200. When the Unlock button is selected, the system 300 prevents changes to the unlocked data quality rule and allows the unlocked data quality rule to be used in a data quality process.

The user interface 1300 also includes a Delete DQ Rule control and a Modify DQ Rule control. The Delete DQ Rule control allows a user to delete the locked data quality rule. When the Delete DQ Rule control is selected, the system 300 deletes the locked data quality rule by removing the locked data quality rule from the rules repository. The system 300 may confirm that the user wishes to delete the locked data quality rule prior to performing the deletion. The Modify DQ Rule control causes the system 300 to display another user interface that allows a user to modify attributes of the locked data quality rule.

FIG. 14 illustrates an exemplary user interface 1400 that may be used to receive input defining modifications to a data quality rule. The user interface 1400 may be displayed based on selection of the Modify DQ Rule control in the user interface 1300. As shown, the user interface 1400 includes components that are similar to the components included in the user interface 900. The system 300 displays the user interface 1400 with current values for the locked data quality rule filled in and allows a user to modify any of the attributes of the locked data quality rule. The system 300 receives modifications to the locked data quality rule and, when the Save button is selected, modifies attributes of the locked data quality in the rules repository based on the received modifications.

Referring again to FIG. 4, the system 300 migrates data quality rules to one or more data quality processing systems (430). For instance, the system 300 migrates profiling data quality rules to one or more data quality processing systems and migrates cleansing data quality rules to one or more data quality processing systems. The system 300 also may migrate linked pairs of data quality rules that have a profiling data quality rule linked to a cleansing data quality rule by linking data in the rules repository.

In migrating data quality rules to one or more data quality processing systems, the system 300 may transform a format of the data quality rules. For example, the system 300 may store the data quality rules in the rules repository in a generic format that is agnostic to the system that will execute the data quality rules. In this example, the system 300 converts the data quality rules from the generic format to a format used by the one or more data quality processing systems that will execute the data quality rules. The system 300 may migrate the data quality rules to a single data quality processing system or multiple, different data quality processing systems that use different formats. The system 300 may include configuration data that allows the system 300 to convert the data quality rules from the generic format to a format appropriate for the one or more data quality processing systems that will be executing the rules. After conversion, the system 300 sends the converted data quality rules to the one or more data quality processing systems for execution against data to be profiled and/or cleansed.

Figure 15:
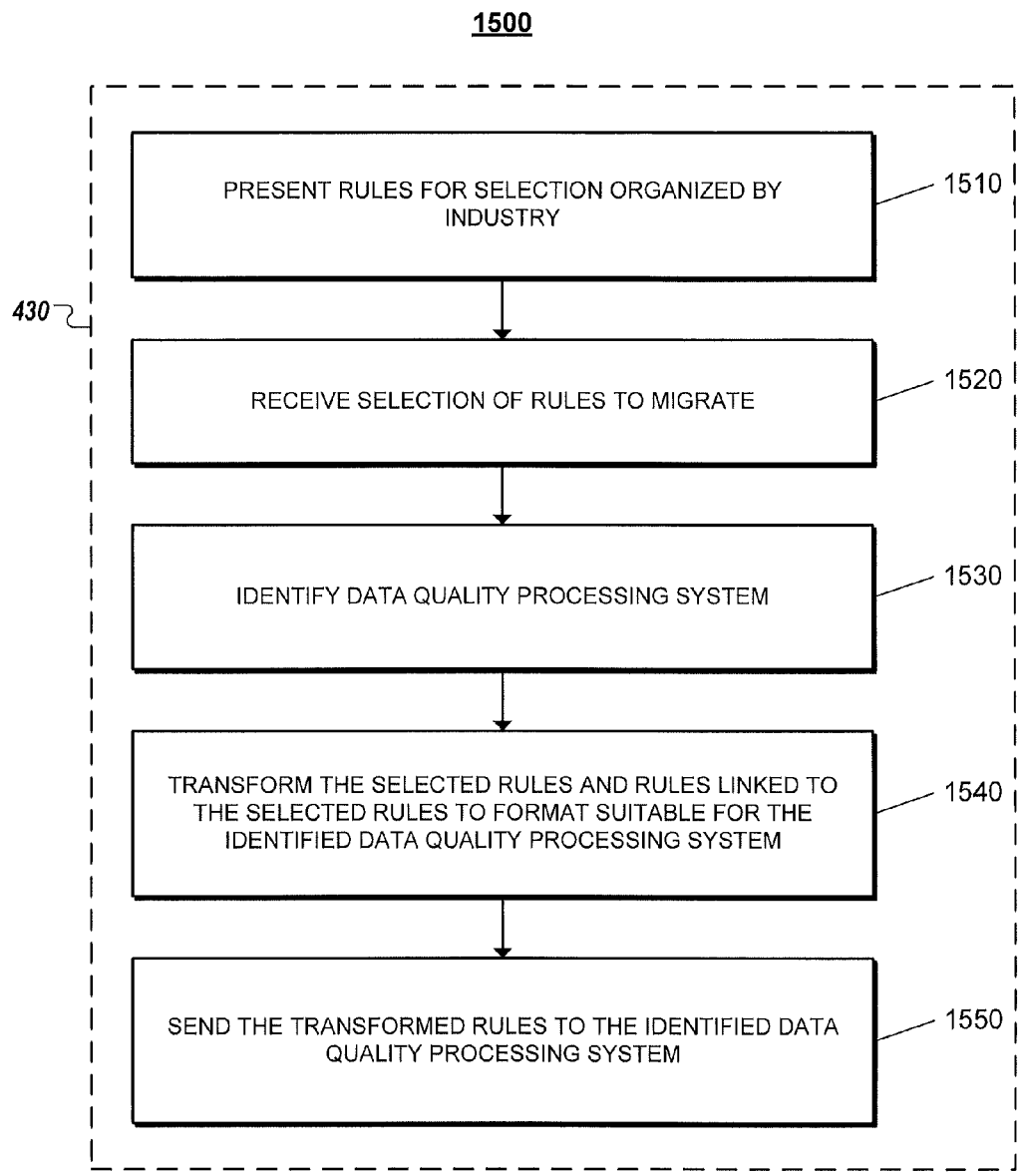

FIG. 15 illustrates a process 1500 for migrating data quality rules to one or more data quality processing systems. The process 1500 may be used in migrating data quality rules referenced above with respect to reference numeral 430. The operations of the process 1500 are described generally as being performed by the system 300. In some implementations, operations of the process 1500 may be performed by one or more processors included in one or more electronic devices.

The system 300 presents rules for selection organized by industry (1510). For example, the system 300 causes display of an interface that shows rules stored in the rules repository in a manner that allows a user to perceive rules organized by industry. In this example, the system 300 may display the interface with industry headers and display data quality rules for each industry arranged in a list under the appropriate industry header. The industry headers may have controls that allow a user to display and hide data quality rules arranged under the industry headers.

The system 300 also may display a list of industries that may be selected by a user. When the system 300 receives selection of an industry from the list, the system 300 displays the data quality rules that are organized within the selected industry. The system 300 may perform additional organizing of data quality rules, such as organizing data quality rules in sub-industries and/or by type (e.g., profiling data quality rules, cleansing data quality rules, column data quality rules, structure data quality rules, business data quality rules, etc.). By presenting rules for selection organized by industry, the system 300 allows users to take advantage of past industry experience and industry expertise that was used to organize the data quality rules by industry in the rules repository.

The system 300 receives selection of rules to migrate (1520). For instance, the system 300 receives user input selecting one or more data quality rules to migrate to a data quality processing system. The user input may include selection of individual data quality rules to migrate or selection of groups of data quality rules to migrate (e.g., user input selecting all rules organized within a particular industry). The system 300 may receive user input selecting profiling data quality rules only, cleansing data quality rules only, or a combination of profiling data quality rules and cleansing data quality rules.

The system 300 identifies a data quality processing system to which the selected rules are to be migrated (1530). For example, the system 300 accesses stored data that indicates one or more data quality processing systems used by a user that selected the rules to migrate. In this example, the system 300 identifies one or more data quality processing systems to which the selected rules are to be migrated based on the accessed data. The system 300 also may access data that indicates one or more data quality processing systems that are predefined to be used for migration of data quality rules and identify the one or more predefined data quality processing systems.

In some implementations, the system 300 is able to connect to and migrate data quality rules to multiple, different data quality processing systems. In these implementations, the system 300 may present a list of the multiple, different data quality processing systems that are available and allow the user to select one or more of the multiple, different data quality processing systems that are available. In these implementations, the system 300 may identify a subset of the multiple, different data quality processing systems based on user selection input. For instance, when the system 300 receives user input selecting, from among the multiple, different data quality processing systems that are available, a particular data quality processing system, the system 300 identifies the particular data quality processing system as the data quality processing system to which the selected rules are to be migrated.

The system 300 transforms the selected rules and rules linked to the selected rules to a format suitable for the identified data quality processing system (1540). For instance, the selected data quality rules may be stored in a rules repository in a generic format. Accordingly, the selected data quality rules need to be transformed into a format used by the one or more identified data quality processing systems for execution.

To transform the selected data quality rules, the system 300 accesses conversion data that defines the format used by the one or more identified data quality processing systems and how to convert data quality rules stored in the generic format to the format used by the one or more identified data quality processing systems. The system 300 then uses the accessed conversion data and transforms the selected data quality rules into the appropriate format. When only a single data quality processing system has been identified, the system 300 converts the selected data quality rules into the appropriate format for the single data quality processing system.

When multiple, different data quality processing systems have been identified, the system 300 converts portions of the selected data quality rules into multiple, different formats used by the multiple, different data quality processing systems. For example, when the system 300 identifies two data quality processing systems, the system 300 may transform a first subset of the selected data quality rules into a first format used by a first data quality processing system and may transform a second subset of the selected data quality rules into a second format used by a second data quality processing system. In this example, the first and second subsets may, in combination, include all of the selected data quality rules. In addition, some data quality rules may overlap the first subset and second subset depending on which data quality rules were selected to be migrated to which one or both of the first and second data quality processing systems. In another example, when the system 300 identifies two data quality processing systems, the system 300 may transform all of the selected data quality rules into a first format used by a first data quality processing system and may transform all of the selected data quality rules into a second format used by a second data quality processing system.

In addition to the selected data quality rules, the system 300 also considers data quality rules linked to the selected data quality rules in performing migration. For instance, the system 300 may access linking data associated with the selected data quality rules and, based on the linking data, determine whether any of the selected data quality rules are linked to other data quality rules. In response to a determination that at least a portion of the selected data quality rules are linked to other data quality rules, the system 300 identifies, based on the linking data, all data quality rules that are linked to one or more of the selected data quality rules and not included in the selected data quality rules. The system 300 then accesses the linked data quality rules and transforms, in addition to the selected data quality rules, the linked data quality rules into a format suitable for the identified one or more data quality processing systems. By transforming the linked data quality rules with the selected data quality rules without requiring the user to identify the linked data quality rules, the system 300 may enhance user convenience by ensuring all appropriate data quality rules are transformed without requiring the user to take time in selecting the linked data quality rules. The system 300 may allow a user to select whether or not linked data quality rules should be migrated. The system also may present the linked data quality rules to the user and ask the user to confirm that the linked data quality rules should be migrated with the selected data quality rules.

The system 300 sends the transformed data quality rules to the identified data quality processing system (1550). For example, after the data quality rules have been transformed into the appropriate format, the system 300 sends the transformed data quality rules to the identified one or more data quality processing systems using one or more electronic communications. In this example, the system 300 may establish, over a network, a connection with the one or more data quality processing systems and load the transformed data quality rules to the identified one or more data quality processing systems over the established connection. Any type of electronic communication may be used to send the transformed data quality rules to the identified one or more data quality processing systems.

Figure 16:
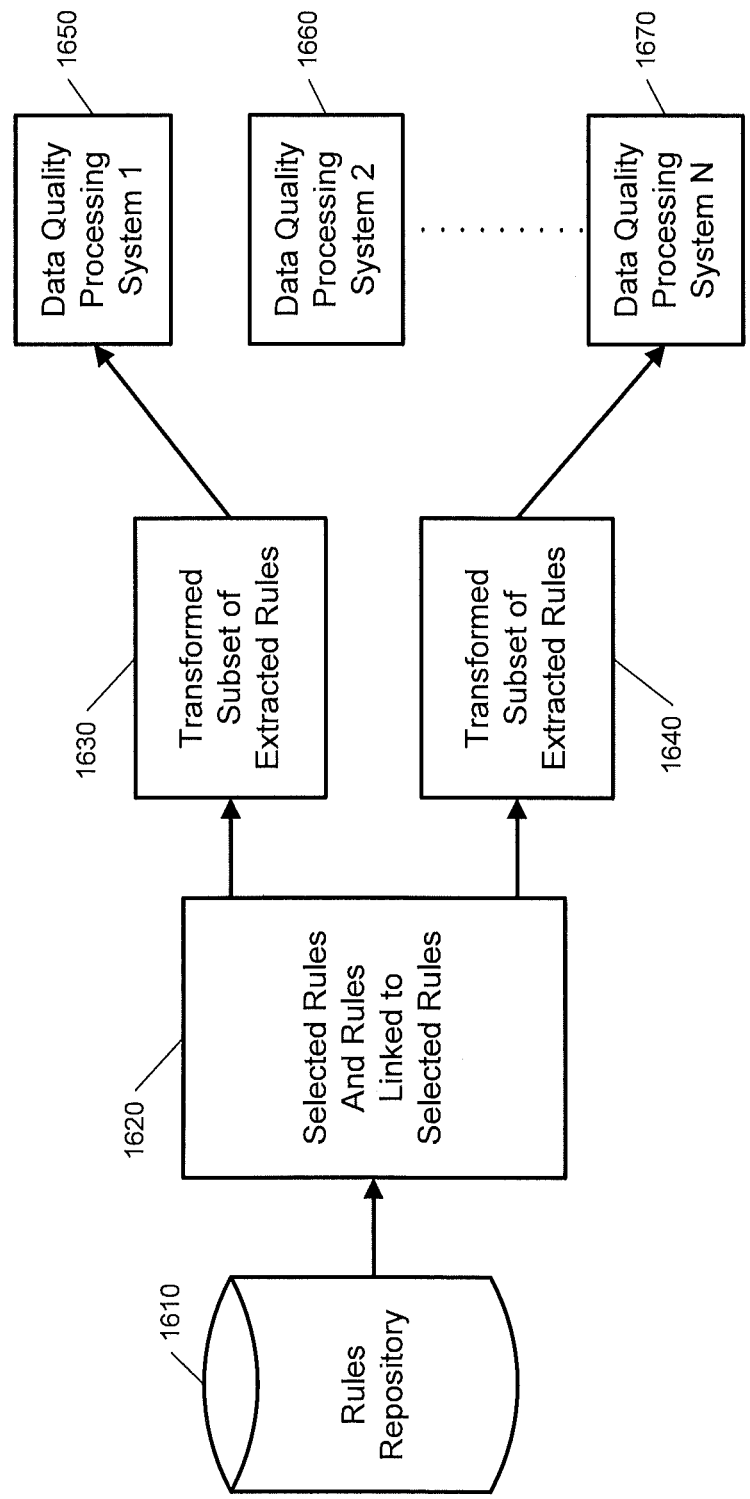

FIG. 16 illustrates an exemplary system 1600 in which rules are being migrated from a rules repository to data quality processing systems. The system 1600 includes a rules repository 1610 and multiple, different data quality processing systems 1650, 1660, and 1670. The system 1600 may be used in implementing the process 1500 discussed above with respect to FIG. 15.

As shown, data quality rules 1620 are accessed from the rules repository 1610. The data quality rules 1620 include data quality rules selected by a user and data quality rules linked to the selected data quality rules by linking data stored in the rules repository 1610. The data quality rules 1620 may be stored in a generic format (e.g., a format that is not used by any of the data quality processing systems 1650, 1660, and 1670) and may include both profiling data quality rules and cleansing data quality rules. The data quality rules 1620 may be accessed from the rules repository 1610 by a data quality management system as described throughout this disclosure.

After the data quality rules 1620 are accessed, the data quality rules 1620 are divided into two subsets and transformed. For example, as shown, a first subset of data quality rules 1630 is being migrated to a first data quality processing system 1650. In this example, data quality rules included in the first subset of data quality rules 1630 are transformed into a first format that is used by the first data quality processing system 1650 and then sent to the first data quality processing system 1650 after transformation. A second subset of data quality rules 1640 is being migrated to a third data quality processing system 1670. Data quality rules included in the second subset of data quality rules 1640 are transformed into a third format that is used by the third data quality processing system 1670 and then sent to the third data quality processing system 1670 after transformation.

In the example shown in FIG. 16, some of the data quality rules 1620 are migrated to the first data quality processing system 1650 and some of the data quality rules 1620 are migrated to the third data quality processing system 1670. In this regard, each of the first data quality processing system 1650 and the third data quality processing system 1670 receive data quality rules in their respective formats and are able to execute the received data quality rules against data to be profiled and/or cleansed. This configuration may allow relatively easy comparison testing of data quality processing systems and also may allow for flexibility in which data quality processing systems are used by a company and for which tasks. For instance, in the example shown in FIG. 16, the first data quality processing system 1650 may be a system that profiles data (or a system that performs profiling relatively well, but cleansing relatively poorly) and the third data quality processing system 1670 may be a system that cleanses data (or a system that performs cleansing relatively well, but profiling relatively poorly). Accordingly, the first subset of data quality rules 1630 may be profiling data quality rules that are migrated to the first data quality processing system 1650 and the second subset of data quality rules 1640 may be cleansing data quality rules that are migrated to the third data quality processing system 1670.

Referring again to FIG. 4, the system 300 manages and monitors a data quality process performed by the one or more data quality processing systems using the migrated data quality rules (440). For instance, the system 300 manages a data quality process performed by the one or more data quality processing systems using migrated profiling data quality rules and migrated cleansing data quality rules. The system 300 may control the one or more data quality processing systems execute the migrated data quality rules. The system 300 also monitors the data quality process performed by the data quality processing system using the migrated data quality rules.

In some implementations, when the migrated data quality rules include one or more linked pairs of data quality rules that have a profiling data quality rule linked to a cleansing data quality rule, the system 300 controls the one or more data quality processing systems to execute the one or more linked pairs of data quality rules in a coordinated manner. In these implementations, the system 300 recognizes that a profiling data quality rule is linked to a cleansing data quality rule based on stored linking data that links the profiling data quality rule to the cleansing data quality rule. Based on the recognition, the system 300 controls the data quality processing system to execute the profiling data quality rule to identify errors in data records and, without user input after controlling the data quality processing system to execute the profiling data quality rule, controls the data quality processing system to execute the cleansing data quality rule on the data records identified as having errors according to the profiling data quality rule. The system 300 may coordinate execution of linked profiling and cleansing data quality rules across multiple, different data quality processing systems.

Figure 17A:
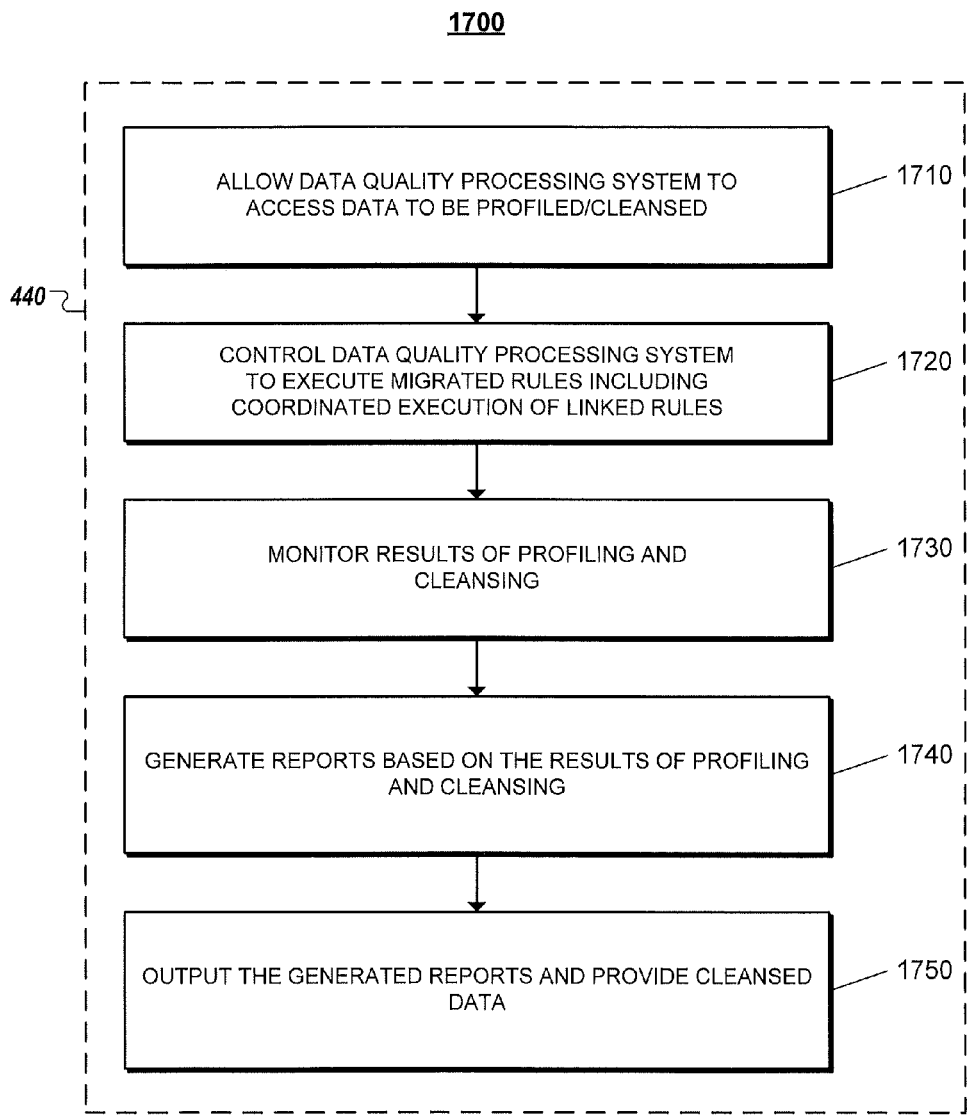

FIG. 17A illustrates a process 1700 for managing and monitoring a data quality process. The process 1700 may be used in managing and monitoring a data quality process referenced above with respect to reference numeral 440. The operations of the process 1700 are described generally as being performed by the system 300. In some implementations, operations of the process 1700 may be performed by one or more processors included in one or more electronic devices.

The system 300 allows a data quality processing system to access data to be profiled and/or cleansed (1710). For example, the system 300 may provide the data quality processing system with information about a data source that allows the data quality processing system to access the data to be profiled and/or cleansed. In this example, the system 300 may provide the data quality processing system with information identifying the data source (e.g., a name and network address of a database system), a location of the data to be profiled and/or cleansed within the data source (e.g., one or more database table names within the data source or a query that may be used to extract the data from the data source), and access information that provides access to the data source (e.g., credentials, such as a password, needed to access the data source). The system 300 also may access the data to be profiled and/or cleansed itself and send the data to be profiled and/or cleansed to the data quality processing system.

In some implementations, the system 300 may allow data quality processing by creating a job in an execution workflow engine included in the system 300. In these implementations, the system 300 may add a new job to the workflow, set dependencies for parent and child jobs, and control the execution workflow engine to handle the processing. An execution workflow engine and techniques for controlling the execution workflow engine are described in co-pending application Ser. No. 12/057,958, titled "System And Method For Automating ETL Applications," which is incorporated by reference in its entirety for all purposes. The techniques described in application Ser. No. 12/057,958 may be used to allow a data quality processing system to access data to be profiled and/or cleansed.

The system 300 controls the data quality processing system to execute migrated data quality rules including coordinated execution of linked profiling and cleansing rules (1720). For example, the system 300 sends instructions to the data quality processing system to run the migrated data quality rules against the data to be profiled and/or cleansed. The system 300 also coordinates execution of linked profiling and cleansing rules by controlling the data quality processing system to execute the profiling data quality rule first and then controlling the data quality processing system to execute the cleansing data quality rule. The system 300 also may determine whether execution of the linked cleansing data quality rule is even necessary based on results of the linked profiling data quality rule (e.g., execute linked cleansing data quality rule only when execution of the linked profiling data quality rule identifies more than a threshold number of errors in the data to be profiled and/or cleansed. The system 300 may coordinate execution of linked profiling and cleansing data quality rules across multiple, different data quality processing systems.

Figure 17B:
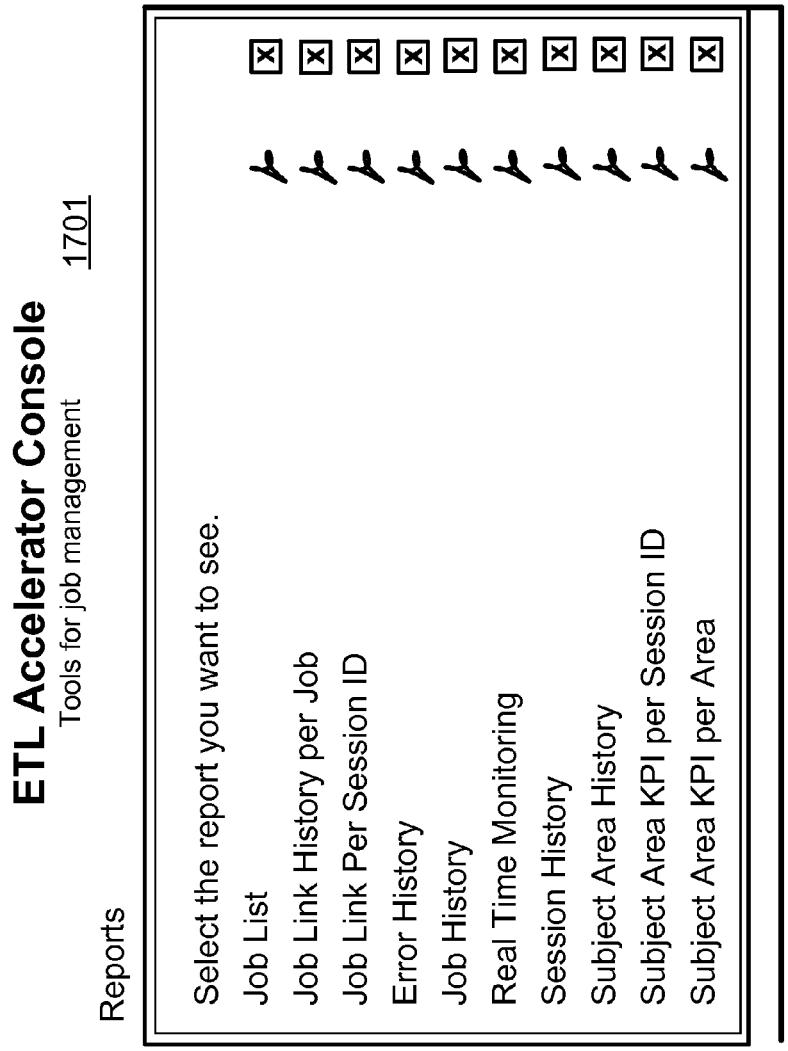

In some examples, the system 300 may use a number of prebuilt reports for monitoring data quality processing and data quality results. In these examples, the system 300 may generate, based on results of data quality processing, the prebuilt reports within predefined parameters for data to include in the prebuilt reports. FIG. 17B illustrates an example user interface 1701 that displays available prebuilt reports and allows a user to select one or more prebuilt reports to be generated by the system 300. As shown, the prebuilt reports may include a job list report, a job link history per job report, a job link per session identifier report, an error history report, a job history report, a real time monitoring report, a session history report, a subject area history report, a subject area key performance indicator per session identifier report, and a subject area key performance indicator per area report. FIG. 17C illustrates an example real time monitoring report 1702. The real time monitoring report 1702 shows real time information related to execution of data quality processing jobs. For instance, as shown, the real time monitoring report 1702 includes, for each job, a job name, a session identifier, a start date, an end date, a number of times executed, a status of the last run, a total number of row reads, a total number of row writes, a total number of row errors, a source name, a target name, and an end state.

The system 300 monitors results of profiling and/or cleansing performed by the data quality processing system (1730). For instance, the system 300 tracks which profiling data quality rules have been executed and which cleansing data quality rules have been executed.

For profiling data quality rules, the system 300 tracks, for each profiling data quality rule, a number of times the profiling data quality rule has been applied with an acceptable result (e.g., no error) and a number of times the profiling data quality rule has been applied with an unacceptable result (e.g., error found). The system 300 also tracks, for each profiling data quality rule, which data records have received an acceptable result and which data records have received an unacceptable result.

For cleansing data quality rules, the system 300 tracks, for each cleansing data quality rule, a number of times the cleansing data quality rule has been applied where cleansing was unnecessary and a number of times the cleansing data quality rule has been applied where cleansing was necessary. The system 300 also tracks, for each cleansing data quality rule, which data records have been cleansed and which data records have not been cleansed.

By monitoring both profiling and cleansing operations, the system 300 tracks early stages of data profiling with later stages of data cleansing. The system 300 monitors all steps of data quality processing to provide an end-to-end view of data quality assessment. In this regard, the system 300 is able to tie early stage profiling operations together with later stage cleansing operations to provide a holistic view of data quality.

The system 300 generates reports based on the results of profiling and/or cleansing performed by the data quality processing system (1740). For example, the system 300 generates reports based on the tracked data monitored from results of profiling and/or cleansing performed by the data quality processing system. In this example, the system 300 may generate reports that include any combination of the tracked data described throughout this disclosure and may generate reports that link profiling operations with cleansing operations (or at least include data related to profiling operations and data related to cleansing operations). The system 300 may generate reports that include data descriptive of which profiling data quality rules have been executed, which cleansing data quality rules have been executed, a number of times profiling data quality rules have been applied with an acceptable result, a number of times profiling data quality rules have been applied with an unacceptable result, which data records have received an acceptable result from profiling, which data records have received an unacceptable result from profiling, a number of times cleansing data quality rules have been applied where cleansing was unnecessary, a number of times cleansing data quality rules have been applied where cleansing was necessary, which data records have been cleansed, and/or which data records have not been cleansed. The system 300 may generate any of the reports shown in FIGS. 18-23.

By integrating both profiling and cleansing data in the generated reports, the system 300 is able to provide report information for all steps of data quality processing to provide an end-to-end view of data quality assessment. In this regard, the system 300 report on early stage profiling operations together with later stage cleansing operations to provide a holistic view of data quality.

The system 300 outputs the generated reports and, when the data quality processing system is controlled to perform cleansing operations, provides cleansed data (1750). For instance, the system 300 displays the generated reports, stores the generated reports in electronic storage, sends the generated reports in an electronic communication (e.g., an electronic mail message), prints a copy of the generated reports using a printing device, or performs any other output operation that allows a user to perceive the generated reports. The system 300 may output any of the reports shown in FIGS. 18-23.

When the data quality processing system is controlled to perform cleansing operations, the system 300 provides cleansed data such that the cleansed data may be used to replace the accessed data prior to cleansing. For instance, the system 300 may send the cleansed data to a database system for handling or may store the cleansed data in a database table that is accessible to the user that initiated the cleansing. The database table may be a new database table created to store the cleansed data or may be an old database table that is overwritten with the cleansed data.

FIG. 18 illustrates an exemplary rules report 1800 that may be generated and output. The rules report 1800 shows information about all the rules applied during profiling and/or cleansing data quality processes. For example, for each rule applied, the rules report 1800 lists the condition defined by the rule, the rule type (e.g., profiling or cleansing), the data quality rule type (e.g., column, structure, or business), how many records the rule has been applied to with an acceptable result (e.g., passes the condition defined by the rule), and how many records the rule has been applied to with an unacceptable result (e.g., does not pass the condition defined by the rule). The system may generate the rules report 1800 for the most recent execution or for a combination of past executions of data quality processes.

Figure 19:
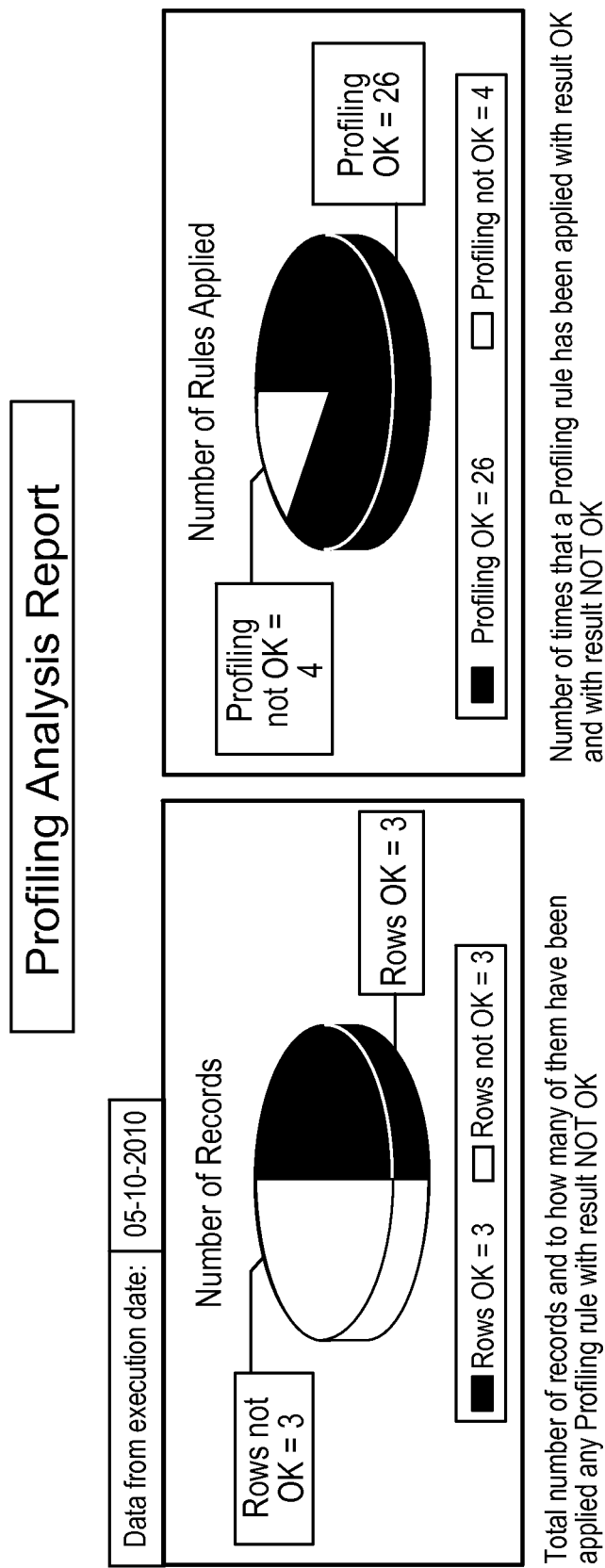

FIG. 19 illustrates an exemplary profiling analysis report 1900 that may be generated and output. The profiling analysis report 1900 shows information about two concepts including profiling number and profiling analysis. The profiling number is the total number of records and how many records any profiling rule has been applied to with an unacceptable result (e.g., does not pass the condition defined by the rule). The profiling analysis is the number of times that a profiling rule has been applied with an acceptable result (e.g., passes the condition defined by the rule) and the number of times that a profiling rule has been applied with an unacceptable result (e.g., does not pass the condition defined by the rule). The system may generate the profiling analysis report 1900 for the most recent execution or for a combination of past executions of data quality processes.

Figure 20:
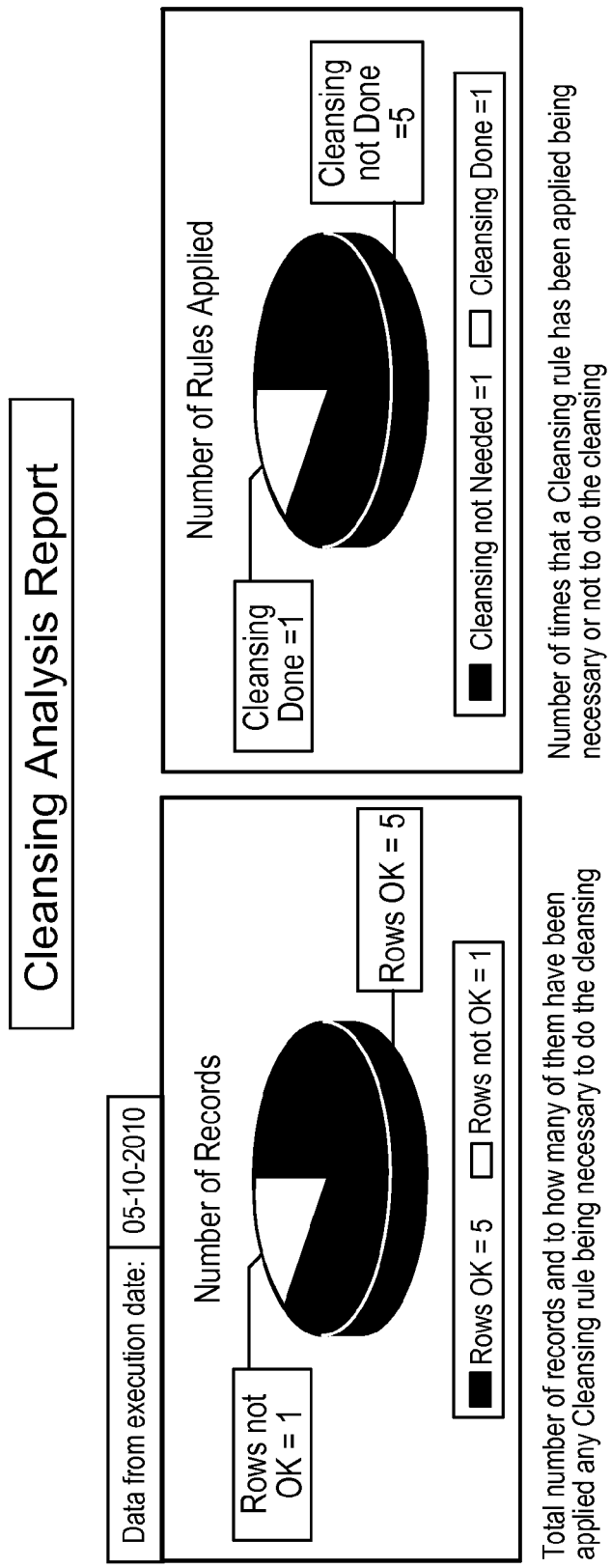

FIG. 20 illustrates an exemplary cleansing analysis report 2000 that may be generated and output. The cleansing analysis report 2000 shows information about two concepts including cleansing number and cleansing analysis. The cleansing number is the total number of records and how many records any cleansing rule has been applied where it was necessary to perform cleansing. The cleansing analysis is the number of times that a cleansing rule has been applied where it was necessary to perform cleansing and the number of times that a cleansing rule has been applied where it was unnecessary to perform cleansing. The system may generate the cleansing analysis report 2000 for the most recent execution or for a combination of past executions of data quality processes.

FIG. 21 illustrates an exemplary profiling input report 2100 that may be generated and output. The profiling input report 2100 shows information about all records each rule has been applied to with an unacceptable result (e.g., does not pass the condition defined by the rule). For each record with an unacceptable result, the profiling input report 2100 shows the rule applied, the condition, and the data quality rule type (e.g., column, structure, or business). The system may generate the profiling input report 2100 for the most recent execution or for a combination of past executions of data quality processes.

FIG. 22 illustrates an exemplary cleansing input report 2200 that may be generated and output. The cleansing input report 2200 shows information about all records each rule has been applied to where cleansing was performed. For each record where cleansing was performed, the cleansing input report 2200 shows the rule applied, the condition, and the data quality rule type (e.g., column, structure, or business). The system may generate the cleansing input report 2200 for the most recent execution or for a combination of past executions of data quality processes.

Figure 23:
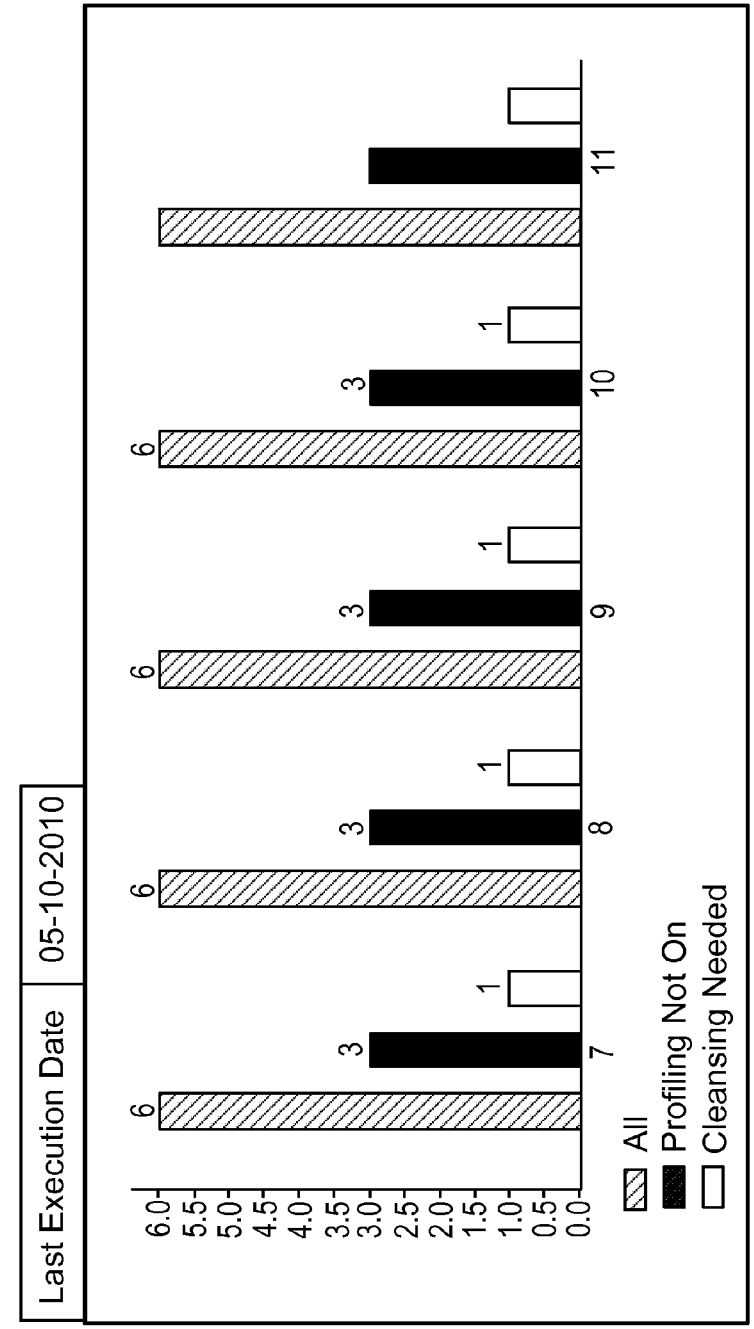

FIG. 23 illustrates an exemplary last execution results report 2300 that may be generated and output. The last execution results report 2300 shows information about records analyzed in the five most recent executions. For each execution, the last execution results report 2300 shows the total number of records analyzed, how many records had an error based on profiling analysis, and how many records needed cleansing based on cleansing analysis.

Figure 24:
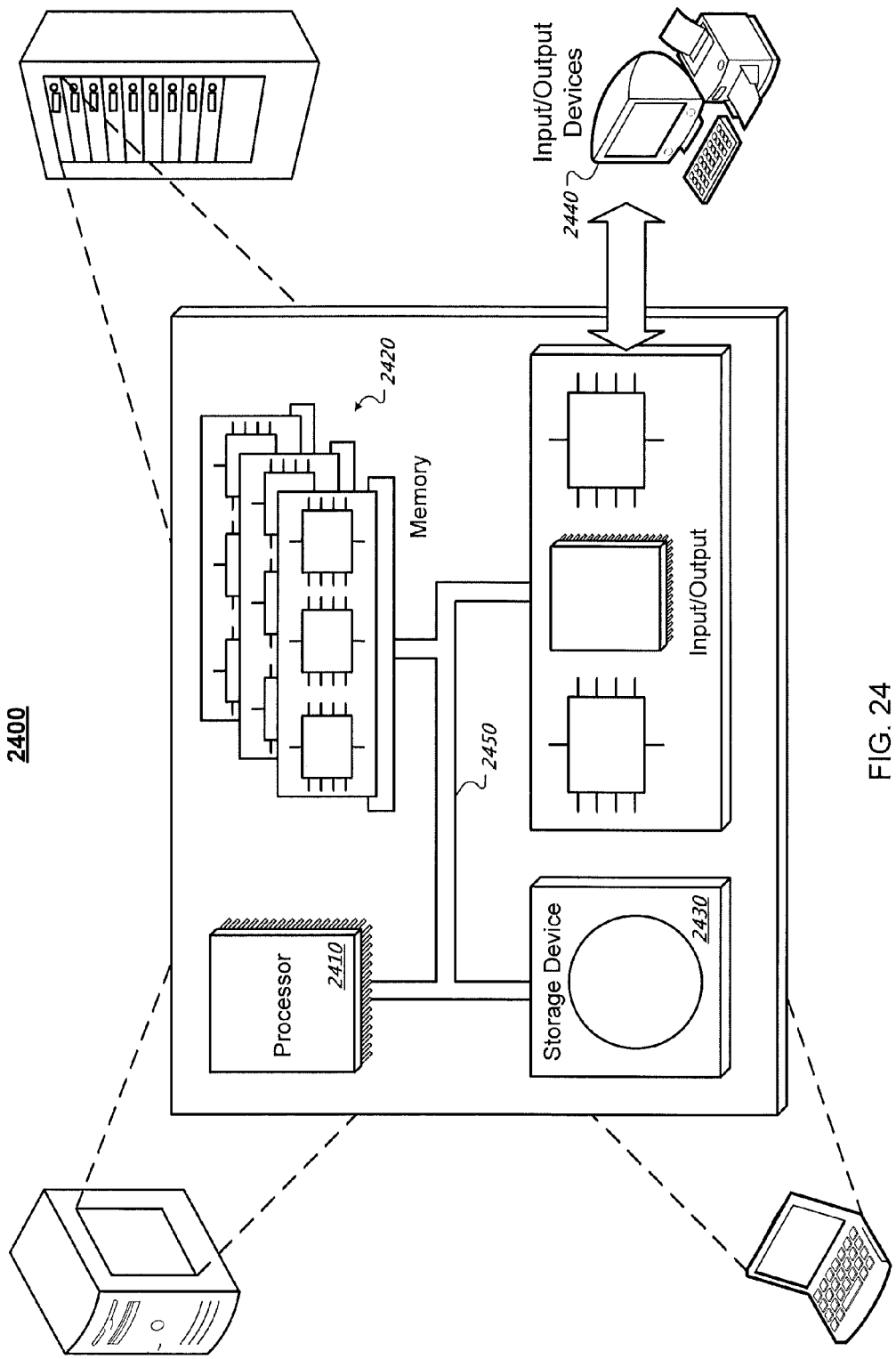

FIG. 24 is a schematic diagram of an example of a generic computer system 2400. The system 2400 can be used for the operations described in association with the processes 400, 500, 800, 1500, and 1700, according to some implementations. The system 2400 may be included in the systems 100, 300, and 1600.

The system 2400 includes a processor 2410, a memory 2420, a storage device 2430, and an input/output device 2440. Each of the components 2410, 2420, 2430, and 2440 are interconnected using a system bus 2450. The processor 2410 is capable of processing instructions for execution within the system 2400. In one implementation, the processor 2410 is a single-threaded processor. In another implementation, the processor 2410 is a multi-threaded processor. The processor 2410 is capable of processing instructions stored in the memory 2420 or on the storage device 2430 to display graphical information for a user interface on the input/output device 2440.

The memory 2420 stores information within the system 2400. In one implementation, the memory 2420 is a computer-readable medium. In one implementation, the memory 2420 is a volatile memory unit. In another implementation, the memory 2420 is a non-volatile memory unit. The processor 2410 and the memory 2420 may perform data manipulation and validation, including execution of data quality jobs.

The storage device 2430 is capable of providing mass storage for the system 2400. In one implementation, the storage device 2430 is a computer-readable medium. In various different implementations, the storage device 2430 may be a floppy disk device, a hard disk device, an optical disk device, or a tape device. The storage device 2430 may store monitoring data collected and data quality rule representations.

The input/output device 2440 provides input/output operations for the system 2400. In one implementation, the input/output device 2440 includes a keyboard and/or pointing device. In another implementation, the input/output device 2440 includes a display unit for displaying graphical user interfaces. The input/output device 2440 may be used to perform data exchange with source and target data quality management and/or processing systems.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A data quality management system comprising:
 a rules repository configured to store profiling data quality rules, cleansing data quality rules, and linking data that links profiling data quality rules to cleansing data quality rules;
 a rules management module configured to manage the rules repository by managing the profiling data quality rules stored in the rules repository, managing the cleansing data quality rules stored in the rules repository, and managing the linking data stored in the rules repository; and
 a data quality job management module configured to migrate data quality rules from the rules repository to a data quality processing system and manage a data quality process performed by the data quality processing system using the migrated data quality rules, the migrated data quality rules including one or more linked pairs of data quality rules that have a profiling data quality rule linked to a cleansing data quality rule by the linking data and the data quality job management module being configured to control the data quality processing system to execute the one or more linked pairs of data quality rules,
 wherein the rules management module is configured to manage the profiling data quality rules stored in the rules repository by accessing profiling and cleansing data quality rules inferred from an analysis of data to be profiled or cleansed and storing the inferred profiling and cleansing data quality rules in the rules repository.

2. The data quality management system of claim 1, wherein the rules repository is configured to store the profiling data quality rules, the cleansing data quality rules, and the linking data in a generic format that is not specific to any particular data quality processing system.

3. The data quality management system of claim 1, wherein the rules management module is configured to organize the profiling data quality rules and the cleansing data quality rules by industry for a user to select a particular industry and receive a subset of the profiling data quality rules and the cleansing data quality rules that are relevant to the particular industry.

4. The data quality management system of claim 1, wherein the data quality job management module is configured to monitor the data quality process performed by the data quality processing system using the migrated data quality rules.

5. The data quality management system of claim 1, wherein the data quality job management module is configured to monitor an entire operation of the data quality process performed by the data quality processing system including monitoring results of data profiling performed by the data quality processing system and monitoring results of data cleansing performed by the data quality processing system.

6. The data quality management system of claim 1, wherein the data quality job management module is configured to control the data quality processing system to execute the one or more linked pairs of data quality rules in a coordinated manner.

7. The data quality management system of claim 1, wherein the rules management module is configured to receive user input defining a new profiling data quality rule and a new cleansing data quality rule and store the new profiling data quality rule and the new cleansing data quality rule in the rules repository.

8. The data quality management system of claim 7:
 wherein the rules management module is configured to receive user input linking the new profiling data quality rule to the new cleansing data quality rule and store, in the rules repository, linking data that links the new profiling data quality rule to the new cleansing data quality rule; and wherein the data quality job management module is configured to recognize that the new profiling data quality rule is linked to the new cleansing data quality rule based on the stored linking data that links the new profiling data quality rule to the new cleansing data quality rule, control the data quality processing system to execute the new profiling data quality rule to identify errors in data records, and, based on the recognition that the new profiling data quality rule is linked to the new cleansing data quality rule and without user input after controlling the data quality processing system to execute the new profiling data quality rule, control the data quality processing system to execute the new cleansing data quality rule on the data records identified as having errors according to the new profiling data quality rule.

9. The data quality management system of claim 1, wherein the rules management module is configured to link profiling data quality rules with cleansing data quality rules, organize profiling data quality rules and cleansing data quality rules by industry, and store, in the rules repository, profiling data quality rules and cleansing data quality rules organized by industry and with linking data that links profiling data quality rules with cleansing data quality rules.

10. The data quality management system of claim 1, wherein the rules management module is configured to modify data quality rules data in the rules repository.

11. A data quality management system comprising:
a rules repository configured to store profiling data quality rules, cleansing data quality rules, and linking data that links profiling data quality rules to cleansing data quality rules;
a rules management module configured to manage the rules repository by managing the profiling data quality rules stored in the rules repository, managing the cleansing data quality rules stored in the rules repository, and managing the linking data stored in the rules repository; and
a data quality job management module configured to migrate data quality rules from the rules repository to a data quality processing system and manage a data quality process performed by the data quality processing system using the migrated data quality rules, the migrated data quality rules including one or more linked pairs of data quality rules that have a profiling data quality rule linked to a cleansing data quality rule by the linking data and the data quality job management module being configured to control the data quality processing system to execute the one or more linked pairs of data quality rules,
wherein the rules management module is configured to receive user input defining a search query for data quality rules in the rules repository, perform a search for data quality rules in the rules repository based on the search query, identify data quality rules in the rules repository that match the search query based on performance of the search, present the identified data quality rules with one or more controls for a user to select one of the identified data quality rules, receive user input selecting a data quality rule from among the identified data quality rules, lock the selected data quality rule based on the selection, allow a change to the selected data quality rule based on locking the selected data quality rule, and prevent changes to data quality rules that are not locked.

12. The data quality management system of claim 11, wherein the rules management module is configured to receive user input to delete the selected data quality rule when the selected data quality rule is locked and delete the selected data quality rule based on the user input to delete the selected data quality rule received when the selected data quality rule is locked.

13. The data quality management system of claim 11, wherein the rules management module is configured to receive user input to modify one or more attributes of the selected data quality rule when the selected data quality rule is locked and modify the one or more attributes of the selected data quality rule based on the user input to modify the one or more attributes of the selected data quality rule received when the selected data quality rule is locked.

14. The data quality management system of claim 1, wherein the data quality job management module is configured to present data quality rules for selection organized by industry, receive user input selecting data quality rules to migrate, identify the data quality processing system to which the selected data quality rules are to be migrated, transform the selected data quality rules and data quality rules linked to the selected data quality rules to a format suitable for the identified data quality processing system, and send the transformed data quality rules to the identified data quality processing system.

15. The data quality management system of claim 1, wherein the data quality job management module is configured to identify, from among multiple, different data quality processing systems and based on user selection, the data quality processing system to which the data quality rules are to be migrated, determine a format suitable for the identified data quality processing system, and transform the data quality rules to the format suitable for the identified data quality processing system.

16. The data quality management system of claim 1, wherein the data quality job management module is configured to allow the data quality processing system to access data to be profiled and cleansed and control the data quality processing system to execute the migrated data quality rules on the data to be profiled and cleansed.

17. The data quality management system of claim 16, wherein the data quality job management module is configured to monitor results of profiling and cleansing performed by the data quality processing system on the data to be profiled and cleansed, generate one or more reports that include information descriptive of profiling and cleansing performed by the data quality processing system based on the results of profiling and cleansing performed by the data quality processing system on the data to be profiled and cleansed, output the one or more generated reports, and provide a cleansed version of the data to be profiled and cleansed.

18. A method comprising:
storing, in a rules repository, profiling data quality rules, cleansing data quality rules, and linking data that links profiling data quality rules to cleansing data quality rules;
managing the rules repository by managing the profiling data quality rules stored in the rules repository, managing the cleansing data quality rules stored in the rules repository, and managing the linking data stored in the rules repository;
migrating data quality rules from the rules repository to a data quality processing system, the migrated data quality rules including one or more linked pairs of data quality rules that have a profiling data quality rule linked to a cleansing data quality rule by the linking data;

managing a data quality process performed by the data quality processing system using the migrated data quality rules, the managing including controlling the data quality processing system to execute the one or more linked pairs of data quality rules, receiving user input defining a search query for data quality rules in the rules repository;

performing a search for data quality rules in the rules repository based on the search query;

identifying data quality rules in the rules repository that match the search query based on performance of the search;

presenting the identified data quality rules with one or more controls for a user to select one of the identified data quality rules;

receiving user input selecting a data quality rule from among the identified data quality rules, locking the selected data quality rule based on the selection;

allowing a change to the selected data quality rule based on locking the selected data quality rule; and preventing changes to data quality rules that are not locked.

19. At least one non-transitory computer-readable storage medium encoded with executable instructions that, when executed by at least one processor, cause the at least one processor to perform operations comprising:

storing, in a rules repository, profiling data quality rules, cleansing data quality rules, and linking data that links profiling data quality rules to cleansing data quality rules;

managing the rules repository by managing the profiling data quality rules stored in the rules repository, managing the cleansing data quality rules stored in the rules repository, and managing the linking data stored in the rules repository;

migrating data quality rules from the rules repository to a data quality processing system, the migrated data quality rules including one or more linked pairs of data quality rules that have a profiling data quality rule linked to a cleansing data quality rule by the linking data;

managing a data quality process performed by the data quality processing system using the migrated data quality rules, the managing including controlling the data quality processing system to execute the one or more linked pairs of data quality rules, receiving user input defining a search query for data quality rules in the rules repository;

performing a search for data quality rules in the rules repository based on the search query;

identifying data quality rules in the rules repository that match the search query based on performance of the search;

presenting the identified data quality rules with one or more controls for a user to select one of the identified data quality rules;

receiving user input selecting a data quality rule from among the identified data quality rules, locking the selected data quality rule based on the selection;

allowing a change to the selected data quality rule based on locking the selected data quality rule;

receiving user input to delete the selected data quality rule when the selected data quality rule is locked;

deleting the selected data quality rule based on the user input to delete the selected data quality rule received when the selected data quality rule is locked; and preventing changes to data quality rules that are not locked.

20. The data quality management system of claim 1, wherein the rules management module is configured to generate the inferred profiling and cleansing data quality rules by accessing the data to be profiled or cleansed, analyzing the accessed data to be profiled or cleansed in an attempt to infer which profiling and cleansing data quality rules are appropriate for assessing quality of the accessed data to be profiled or cleansed, and automatically, without user intervention, inferring one or more profiling and cleansing data quality rules that are appropriate based on the analysis of the accessed data to be profiled or cleansed.

* * * * *

UNITED STATES PATENT AND TRADEMARK OFFICE
CERTIFICATE OF CORRECTION

PATENT NO.       : 8,666,919 B2
APPLICATION NO.  : 13/194135
DATED            : March 4, 2014
INVENTOR(S)      : Miranda et al.

It is certified that error appears in the above-identified patent and that said Letters Patent is hereby corrected as shown below:

In the Claims

Claim 18, column 29, line 5, delete "rules," and insert -- rules; --, therefor.

Claim 18, column 29, line 17, delete "rules," and insert -- rules; --, therefor.

Claim 19, column 30, line 5, delete "rules," and insert -- rules; --, therefor.

Claim 19, column 30, line 18, delete "rules," and insert -- rules; --, therefor.

Signed and Sealed this
Tenth Day of June, 2014

Michelle K. Lee
*Deputy Director of the United States Patent and Trademark Office*